US008665076B2

(12) United States Patent
Okimoto et al.

(10) Patent No.: US 8,665,076 B2
(45) Date of Patent: Mar. 4, 2014

(54) TACTILE FEEDBACK METHOD AND SYSTEM, COMPUTER PROGRAM AND STORAGE MEDIUM THAT STORES THE COMPUTER PROGRAM

(75) Inventors: Yoshiyuki Okimoto, Osaka (JP); Hideto Motomura, Osaka (JP)

(73) Assignee: Panasonic Corporation, Osaka (JP)

( * ) Notice: Subject to any disclaimer, the term of this patent is extended or adjusted under 35 U.S.C. 154(b) by 373 days.

(21) Appl. No.: 13/162,627

(22) Filed: Jun. 17, 2011

(65) Prior Publication Data

US 2011/0254671 A1    Oct. 20, 2011

Related U.S. Application Data

(63) Continuation of application No. PCT/JP2010/005338, filed on Aug. 30, 2010.

(30) Foreign Application Priority Data

Sep. 3, 2009   (JP) ................................. 2009-203542

(51) Int. Cl.
*H04B 3/36*    (2006.01)
(52) U.S. Cl.
USPC .......... 340/407.1; 345/156; 345/173; 341/20; 341/21; 341/27
(58) Field of Classification Search
USPC ............. 340/407.1; 345/156, 173; 178/18.01; 341/21, 20, 27; 414/5
See application file for complete search history.

(56) References Cited

U.S. PATENT DOCUMENTS 5,583,478 A  *  12/1996  Renzi ......................... 340/407.1
(Continued)

FOREIGN PATENT DOCUMENTS

JP        09-090867 A      4/1997
(Continued)

OTHER PUBLICATIONS

International Search Report for International Application No. PCT/JP2010/005338 mailed Dec. 14, 2010.

(Continued)

*Primary Examiner* — Daryl Pope
(74) *Attorney, Agent, or Firm* — Renner, Otto, Boisselle & Sklar, LLP

(57)    ABSTRACT

A tactile feedback system includes: a removing section for removing a contact-device-specific oscillating waveform, included in both a first contact-generated waveform representing a frictional vibration produced when a contact device contacts with one object and a second contact-generated waveform representing a frictional vibration produced when the contact device contacts with another object, from the first contact-generated waveform; a superposing section for superposing a finger-pulp-specific oscillating waveform, included in both the first finger-pulp-generated waveform representing a frictional vibration produced when a person's finger pulp contacts with the one object and the second finger-pulp-generated waveform representing a frictional vibration produced when the finger pulp contacts with that another object, on the first contact-generated waveform from which the contact-device-specific oscillating waveform has been removed; and a simulating section for displaying a vibration stimulation based on the first contact-generated waveform on which the finger-pulp-specific oscillating waveform has been superposed.

13 Claims, 13 Drawing Sheets

(56) References Cited

U.S. PATENT DOCUMENTS

| | | | |
|---|---|---|---|
| 7,450,110 B2* | 11/2008 | Shahoian et al. | 345/173 |
| 8,188,981 B2* | 5/2012 | Shahoian et al. | 345/173 |
| 2006/0279537 A1 | 12/2006 | Kim et al. | |
| 2007/0038512 A1* | 2/2007 | Reddy et al. | 705/14 |
| 2009/0133508 A1* | 5/2009 | Johansson et al. | 73/862.046 |
| 2009/0167507 A1* | 7/2009 | Maenpaa | 340/407.2 |

FOREIGN PATENT DOCUMENTS

| | | |
|---|---|---|
| JP | 09-155785 A | 6/1997 |
| JP | 11-150794 A | 6/1999 |
| JP | 2000-047567 A | 8/2000 |
| JP | 2001-306200 A | 11/2001 |
| JP | 2006-058973 A | 3/2006 |

OTHER PUBLICATIONS

Iwamura, "Touch", Igaku-Shoin ltd,. pp. 26-28 ad pp. 208-211, (2001).

Srinivasan et al., "An Investigation of the Mechanics of Tactile Sense Using Two-Dimensional Models of the Primate Fingertip", Trans. ASME, J. Biomech., Eng., 118, (1996), pp. 48-55.

Kobayashi et al., "Relationship between the Structure of Finger Tissue and the Location of Tactile Receptors: $2^{nd}$ Report, Method of Dynamic Contact Analysis and Results for Contact Between the Finger and Plane Plate", Transactions of the Japan Society of Mechanical Engineers, Series C., (1998), pp. 4798-4805.

Konyo et al., "Tactile Feeling Display for Touch of Cloth Using Soft High Polymer Gel Actuators", TVRSJ, vol. 6, No. 4 (2001), pp. 323-328.

Nakano e al., "Conditional Expression for the Occurrence of Stick-Slip Motion Based on the Coulomb Friction Model (Part 1)", Journal of Japanese Society of Tribologists, vol. 51, No. 2, (2006), pp. 131-139.

Shikano et al., "Digital Signal Processing on Speech and Audio Information", Shokodo, Co., Ltd., 1997, pp. 10-16.

Iwamoto et al., "Tactile Sensing Based on Human-Finger Vibration Measurement", Proceedings of $23^{rd}$ Sensing Forum, (2006), pp. 285-288.

Okamoto et al., "Development of Master-Slave Typed Tactile Telepresence System", The Robotics Society of Japan, Sep. 14, 2006, pp. 1-3.

Kaneko et al., "Tracing Type Artificial Active Antenna", The Robotics Society of Japan, Sep. 18, 1998, pp. 877-878.

Konyo et al., "A Display Method of Artificial Tactile Sensation Using Amplitude Modulations of Ultrasonic Vibration", The Robotics Society of Japan, Sep. 14, 2006, pp. 1-4.

Iwamura, "Touch", Igaku-Shoin ltd,. pp. 26-28 and pp. 208-211, (2001), with partial English translation.

Shikano et al., "Digital Signal Processing on Speech and Audio Information", Shokodo, Co., Ltd., 1997, pp. 10-16, with partial English translation.

\* cited by examiner

FIG.9
| CONTACT MOVEMENT | | POWER PEAK INFORMATION | |
|---|---|---|---|
| RELATIVE VELOCITY [mm/s] | PRESSING FORCE [N] | FREQUENCY [Hz] | POWER [dB] |
| 5 | 0.1 | 50 | 10 |
| 5 | 0.1 | 75 | 8 |
| 5 | 0.2 | 55 | 9 |
| : | : | : | : |
| v | F | fx | θp |
| : | : | : | : |
FIG.10A
WHEN DETERMINING TRANSFER FUNCTION
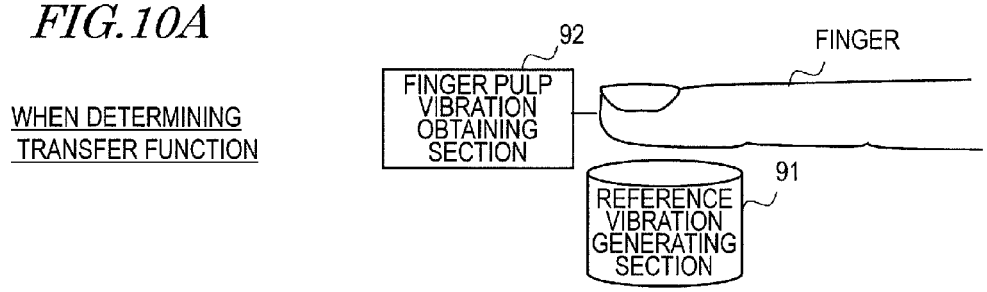
FIG.10B
WHEN GETTING FRICTIONAL VIBRATION INFORMATION
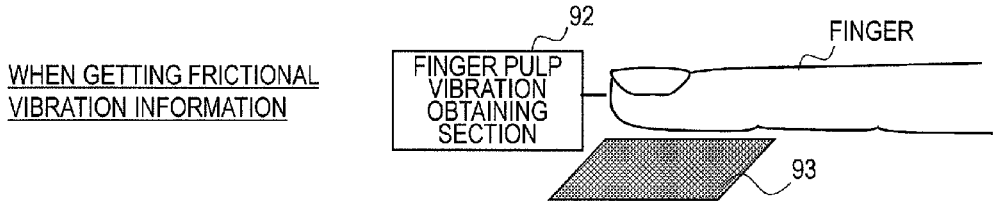
FIG.11
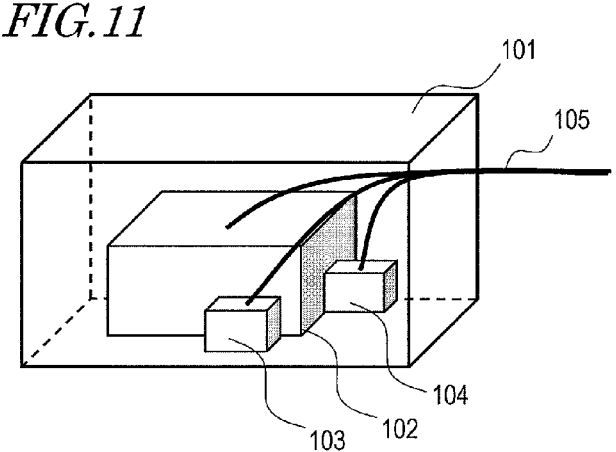

*FIG.16*

| CONTACT DEVICE INDEX | CONTACT MOVEMENT | | POWER PEAK INFORMATION | |
|---|---|---|---|---|
| | RELATIVE VELOCITY [mm/s] | PRESSING FORCE [N] | FREQUENCY [Hz] | POWER [dB] |
| 1 | 5 | 0.1 | 50 | 10 |
| 1 | 5 | 0.1 | 75 | 8 |
| 1 | 5 | 0.2 | 55 | 9 |
| : | : | : | : | : |
| 1 | v | F | fx | $\theta p$ |
| : | : | : | : | : |
| g | 5 | 0.1 | 50 | 15 |
| g | 5 | 0.2 | 100 | 12 |
| : | : | : | : | : |

US 8,665,076 B2

TACTILE FEEDBACK METHOD AND SYSTEM, COMPUTER PROGRAM AND STORAGE MEDIUM THAT STORES THE COMPUTER PROGRAM

This is a continuation of International Application No. PCT/JP2010/005338, with an international filing date of Aug. 30, 2010, which claims priority of Japanese Patent Application No. 2009-203542, filed on Sep. 3, 2009, the contents of which are hereby incorporated by reference.

BACKGROUND OF THE INVENTION

1. Field of the Invention

The present invention relates to a technology for simulating a tactile sensation that a person would get when touching an object, and more particularly relates to a technology for simulating a tactile sensation to be gotten by him or her about the material or shape of that object.

2. Description of the Related Art

Recently, thanks to development of audiovisual technologies and network technologies and expansion of their infrastructures, video (visual information) and audio (audio information) can now be transmitted to any distant location with a rather high degree of reality. But there should be ever-increasing demands in the near future for transmitting such audiovisual information over telecommunications lines with even higher degree of reality and presence. To realize that, demands for not just further development of audiovisual technologies but also development of new technologies for communicating or simulating non-audiovisual information (i.e., information concerning the sense of touch or sense of smell) should rise in the future. Among other things, the tactile sensation is a feel that a person who has touched an object gets, and therefore, is a very ordinary sensation familiar to everybody, and would be said to be a very important sensation in order to give a high degree of presence to a recipient.

When a person touches an object, he or she receives various kinds of sensations, which can be classified into several categories including temperature-related sensations such as hot feel and cold feel, force-related sensations that he or she gets as pressure or stress when feeling the hardness or shape of the object, and tactile sensations such as soft feel or rough feel that he or she gets when feeling the material or shape at the surface of the object. It is known that among these various sensations, the force-related sensations and the tactile sensations are received through four mechanoreceptors called "Meissner corpuscles", "Merkel's cells", "corpuscles of Pacini" and "Ruffini ending" that are present under the human skin (see Iwamura, "Touch", Igaku-Shoin Ltd., pp. 26-28 and pp. 208-211, (2001)). It has also turned out, as a result of recent researches, that these mechanoreceptors sense the pressure or vibration, which has been produced by a contact between the skin and the object, as a variation in strain energy density distribution (see Srinivasan, M. A. and Dandekar K., "An Investigation of the Mechanics of Tactile Sense Using Two-Dimensional Models of the Primate Fingertip", Trans. ASME, J. Biomech. Eng., 118, (1996), pp. 48-55, and also see Kobayashi and Maeno, "Relationship between the Structure of Finger Tissue and the Location of Tactile Receptors: 2nd Report, Method of Dynamic Contact Analysis and Results for Contact between the Finger and Plane Plate", Transactions of the Japan Society of Mechanical Engineers, Series C, (1998), pp. 4798-4805). In view of these considerations, a lot of researchers have already reported that if those mechanoreceptors are stimulated by giving some mechanical stimulation such as pressure or vibration to a person's skin surface using an actuator as a tactile simulator, then the person could get a tactile sensation that is quite different from the material feel of the tactile simulator itself.

For example, by paying special attention to the fact that when a person touches an object with unevenness, reactive force will be applied to the surface of his or her finger pulp perpendicularly to (i.e., along a normal to) that unevenness of the object, Japanese Patent Application Laid-Open Publication No. 2000-47567 discloses, in particular, on pp. 8-9 and FIGS. 8 and 9, a method for making the person virtually feel the surface unevenness of the object by controlling the direction of the reactive force to display. Specifically, for that purpose, in accordance with the information about the object's surface unevenness to simulate, normal vectors are defined in advance at respective very small intervals and reactive forces represented by those normal vectors are generated by a force transducer, thereby simulating the sensation to be gotten by feeling the uneven surface. Thus, it can be said that when some force is going to be simulated by displaying a reactive force, for example, a force-related sensation that a person gets when feeling mainly the hardness or shape of the object is going to be simulated.

Meanwhile, when a person attempts to get a material feel of the object by touching it, he or she "rubs" the object with his or her fingers. This movement is done probably because the person tries to get a tactile sensation of the object by making the mechanoreceptors under the finger skin sense the frictional vibration that has been produced by that "rubbing" movement. That is why in order to simulate a tactile sensation, it is an effective measure to take to display a vibration stimulus to the skin surface.

A number of researches that are based on such an idea have been reported so far. For example, Japanese Patent Application Laid-Open Publication No. 11-150794 discloses, in particular, on pp. 3-5 and FIG. 1, a tactile display method for displaying a tactile sensation by using a huge number of microactuators with electromagnetic coil. Those microactuators are arranged at very narrow intervals of about 2 mm and are pressed against a person's palm. They confirmed via experiments that by supplying appropriately controlled amounts of drive current in mutually different phases to those actuators, the person would get multiple different kinds of tactile sensations at his or her palm to which those actuators are pressed.

Likewise, Konyo, Tadokoro, Takamori, Oguro and Tokuda, "Tactile Feeling Display for Touch of Cloth Using Soft High Polymer Gel Actuators", TVRSJ, Vol. 6, No. 4 (2001), pp. 323-328 (hereinafter referred to as "Konyo et al.") discloses a similar method for displaying a vibration stimulus to a person's finger pulp surface by arranging two-dimensionally fibers of ion conductive polymer gel called "ICP actuators" and applying an oscillatory voltage to those fibers. According to their technique, the oscillatory voltage to apply is a combined wave of two signals with mutually different frequencies. And they also confirmed via psychological experiments that by changing the combinations of the frequencies, the subject got tactile sensations as if he or she felt a number of different pieces of cloth.

In these examples, they just defined experimentally how a person's tactile sensation would change with a drive signal applied to a tactile simulator. However, various inventions have already been made as to how to synthesize a tactile simulation signal for simulating a particular tactile sensation. For example, Japanese Patent Application Laid-Open Publication No. 9-155785 (hereinafter referred to as "JP9-155785") discloses, in particular, on pp. 3-4 and FIG. 1, a method for displaying an object's feel by synthesizing a tactile simulation signal based on a sensor signal, which has been obtained through a direct contact with the object, and by reference to a table. In that table, stored are various parameters that are essential to the tactile sensation to simulate and that determine the tactile simulation signal. Examples of those parameters include waveform period, amplitude, and rise and fall times. The tactile simulation signal is synthesized based on these parameters.

On the other hand, Japanese Patent Application Laid-Open Publication No. 2001-306200 (hereinafter referred to as "JP2001-306200") discloses, in particular, on p. 6 and FIG. 10, a method for defining a number of different tactile simulation signals in advance as basic simulation signals. This method is based on the fact that two objects with similar surface shapes would produce reactive forces with similar oscillating waveforms when touched. In generating a tactile simulation signal for a given object, it is determined which basic simulation signal needs to be used and then the waveform of the basic simulation signal is shaped according to a difference in surface shape of the object from others.

Furthermore, Japanese Patent Application Laid-Open Publication No. 2006-58973 (hereinafter referred to as "JP2006-58973") discloses, in particular, on pp. 9-11 and FIG. 11, a method for generating a tactile simulation signal by extracting and breaking down waves with typical frequencies and amplitudes from an oscillating waveform representing the force that has been obtained with a sensor and by shaping and synthesizing together those waves according to the property of the person's tactile sensation.

According to these conventional technologies, however, the tactile sensations of only limited kinds of objects can be simulated. In addition, just limited types of tactile sensations can barely be simulated and far from being natural.

Generally speaking, a tactile simulation signal is synthesized by performing roughly two processing steps of: sensing an object, of which the tactile sensation needs to be simulated, to obtain material information (Step 1); and synthesizing a tactile simulation signal based on a result of that sensing (Step 2). FIG. 1 illustrates a specific example of these two processing steps 1 and 2 for synthesizing a tactile simulation signal. In Step 2, the feedback signal is synthesized based on only the information that has been collected in advance and the information that has been obtained in Step 1 about the object, of which the tactile sensation needs to be simulated. That is why according to such a method, if any other piece of information is required, the tactile sensation of the object cannot be simulated.

According to JP9-155785, for example, to synthesize a tactile simulation signal, a table that stores parameters determining the tactile simulation signal is made reference to. With such a method adopted, if no item on the table applies to a result obtained by the object sensing processing step 1, the tactile simulation signal cannot be synthesized.

The same can be said about JP2001-306200, in which tactile simulation signals are defined in advance as basic simulation signals and in which the tactile simulation signal of an object cannot be synthesized, either, unless the object falls within the range of those basic simulation signals. As a result, only the tactile sensations of prepared objects can be simulated. That is to say, the range of objects, of which the tactile sensations can be simulated, is very narrow.

As far as the synthesis of the tactile simulation signal is concerned, there are various sorts of approaches, which can be classified into the two major categories. One approach is pre-designing models for synthesizing the tactile simulation signal based on either physical data or the data about persons' tactile sensation properties and setting parameters using the information that has been obtained about the object in the processing step 1, thereby synthesizing the signal. The other approach is generating the tactile simulation signal by shaping a time waveform signal that has been obtained by a sensor.

The former approach is taken by JP9-155785, for example. According to JP9-155785, to display a tactile sensation as a vibration of a voice coil motor, the parameters of that vibration, including the oscillation period, amplitude, and rise and fall times, are determined based on a result obtained by sensing the object. However, no model that can perfectly describe, for every possible combination of materials, what kind of frictional vibration will be produced when the two materials rub against each other has ever been discovered. Likewise, sufficient knowledge has not been obtained yet as to what combination of firing patterns of the tactile receptors or what kind of vibration of the skin surface makes the person get a soft feel or a rough feel, for example.

Under the circumstances such as these, it is unthinkable that each and every one of tactile sensations that a person would get by feeling various materials can be simulated with such a tactile simulation signal that has been synthesized based on a simple model. According to JP9-155785, among other things, the oscillation frequency of the actuator is a single frequency, and therefore, the number of tactile sensations that can be simulated should be very small.

On the other hand, according to the latter approach of shaping the waveform of a signal obtained from a sensor, it is very important how much the vibration stimulus that a tactile simulator displays to the person's skin surface resembles the frictional vibration to be produced when the skin actually rubs the object. In this case, there are two pairs of materials to rub against each other. Even though one of the two materials is the same in the two pairs, the other material of one pair is different from that of the other. That is why the frictional vibration produced by one pair should be different from the one produced by the other. That is to say, the vibration produced by rubbing the object with the sensor should be different from the one produced by rubbing the same object with the skin. For that reason, if the latter approach is taken, the signal waveform needs to be shaped with such a variation in oscillating waveform taken into account. According to JP2006-58973, a time waveform signal is obtained using force detecting sensors or acceleration sensors that are attached to the fingertips of a glove and then has its waveform shaped adaptively to the human tactile sensation property. Nevertheless, JP2006-58973 does not pay attention to the fact that the vibration property of the glove is different from that of the finger elastic body. In that sense, even if the technique disclosed in JP2006-58973 is adopted, the person should not be able to get a realistic tactile sensation for the reasons described above.

SUMMARY OF THE INVENTION

It is therefore an object of the present invention to simulate a variety of tactile sensations that a person will get when feeling various objects.

A tactile feedback system according to the present invention includes: a removing section for removing a contact-device-specific oscillating waveform, which is included in both of first and second contact-generated waveforms, from the first contact-generated waveform, wherein the first contact-generated waveform represents a frictional vibration produced when a contact device contacts with one object, and the second contact-generated waveform represents a frictional vibration produced when the contact device contacts with another object; a superposing section for superposing a finger-pulp-specific oscillating waveform, which is included in both of first and second finger-pulp-generated waveforms, on the first contact-generated waveform, from which the contact-device-specific oscillating waveform has been removed, wherein the first finger-pulp-generated waveform represents a frictional vibration produced when a person's finger pulp contacts with the one object, and the second finger-pulp-generated waveform represents a frictional vibration produced when the finger pulp contacts with that another object; and a simulating section for displaying a vibration stimulation based on the first contact-generated waveform on which the finger-pulp-specific oscillating waveform has been superposed.

The contact-device-specific oscillating waveform may be determined by object's physical quantity measured and by a type of contact movement between the contact device and the object, and the finger-pulp-specific oscillating waveform may also be determined by the physical quantity measured and the contact movement.

The contact movement may be defined by a relative velocity of the contact device with respect to the object.

The contact movement may be defined by a load of the contact device that is pressed against the object.

The contact-device-specific oscillating waveform may be determined by a power peak that is included in the waveform representing the frictional vibration produced between the contact device and the object.

The finger-pulp-specific oscillating waveform may be determined by a power peak that is included in the waveform representing the frictional vibration produced between the finger pulp and the object.

The contact-device-specific oscillating waveform may be determined by the number of frictional vibration waveforms that have power peaks falling within a predetermined range in multiple waveforms representing frictional vibrations produced by tracing a plurality of objects with the contact device.

The finger-pulp-specific oscillating waveform may be determined by the number of frictional vibration waveforms that have power peaks falling within a predetermined range in multiple waveforms representing frictional vibrations produced by tracing a plurality of objects with the finger pulp.

The first and second contact-generated waveforms may be represented by a power spectrum showing a frequency-power relation, and the contact-device-specific oscillating waveform may be a waveform component that is included in both of the power spectra of the first and second contact-generated waveforms.

The first and second finger-pulp-generated waveforms may be represented by a power spectrum showing a frequency-power relation, and the finger-pulp-specific oscillating waveform may be a waveform component that is included in both of the power spectra of the first and second finger-pulp-generated waveforms.

A tactile feedback method according to the present invention includes the steps of: removing a contact-device-specific oscillating waveform, which is included in both of first and second contact-generated waveforms, from the first contact-generated waveform, wherein the first contact-generated waveform represents a frictional vibration produced when a contact device contacts with one object, and the second contact-generated waveform represents a frictional vibration produced when the contact device contacts with another object; superposing a finger-pulp-specific oscillating waveform, which is included in both of first and second finger-pulp-generated waveforms, on the first contact-generated waveform, from which the contact-device-specific oscillating waveform has been removed, wherein the first finger-pulp-generated waveform represents a frictional vibration produced when a person's finger pulp contacts with the one object, and the second finger-pulp-generated waveform represents a frictional vibration produced when the finger pulp contacts with that another object; and displaying a vibration stimulation based on the first contact-generated waveform on which the finger-pulp-specific oscillating waveform has been superposed.

A computer program according to the present invention is designed to be executed by a computer. And the computer program is defined to make the computer perform the steps of: removing a contact-device-specific oscillating waveform, which is included in both of first and second contact-generated waveforms, from the first contact-generated waveform, wherein the first contact-generated waveform represents a frictional vibration produced when a contact device contacts with one object, and the second contact-generated waveform represents a frictional vibration produced when the contact device contacts with another object; superposing a finger-pulp-specific oscillating waveform, which is included in both of first and second finger-pulp-generated waveforms, on the first contact-generated waveform, from which the contact-device-specific oscillating waveform has been removed, wherein the first finger-pulp-generated waveform represents a frictional vibration produced when a person's finger pulp contacts with the one object, and the second finger-pulp-generated waveform represents a frictional vibration produced when the finger pulp contacts with that another object; and displaying a vibration stimulation based on the first contact-generated waveform on which the finger-pulp-specific oscillating waveform has been superposed.

A storage medium according to the present invention may store thereon the computer program of the present invention described above.

Another tactile feedback system according to the present invention includes: a removing section for removing a contact-device-specific oscillating waveform, which is included in both of first and second contact-generated waveforms, from the first contact-generated waveform, wherein the first contact-generated waveform represents a frictional vibration produced when a contact device contacts with one object, and the second contact-generated waveform represents a frictional vibration produced when the contact device contacts with another object; and a superposing section for superposing a finger-pulp-specific oscillating waveform, which is included in both of first and second finger-pulp-generated waveforms, on the first contact-generated waveform, from which the contact-device-specific oscillating waveform has been removed, wherein the first finger-pulp-generated waveform represents a frictional vibration produced when a person's finger pulp contacts with the one object, and the second finger-pulp-generated waveform represents a frictional vibration produced when the finger pulp contacts with that another object.

The tactile feedback apparatus of the present invention can synthesize a tactile simulation signal, which simulates the frictional vibration that would be produced on the person's finger pulp if he or she traced an object with his or her finger pulp, based on the information that has been obtained by tracing the object with a contact device, and information that has been collected in advance about the contact device and the finger pulp. As a result, the person can get a natural and realistic tactile sensation without limiting objects available for the simulations.

Other features, elements, processes, steps, characteristics and advantages of the present invention will become more

BRIEF DESCRIPTION OF THE DRAWINGS

FIG. 9 shows what may be stored in a contact-device-specific peak storage section 207.

FIGS. 10A and 10B illustrate an exemplary method for estimating the vibration at the surface of a finger pulp.

FIG. 11 illustrates an exemplary configuration for a tracer 101.

FIG. 16 shows an example of a table stored in a contact-device-specific peak storage section 1406.

DETAILED DESCRIPTION OF PREFERRED EMBODIMENTS

Figure 1:
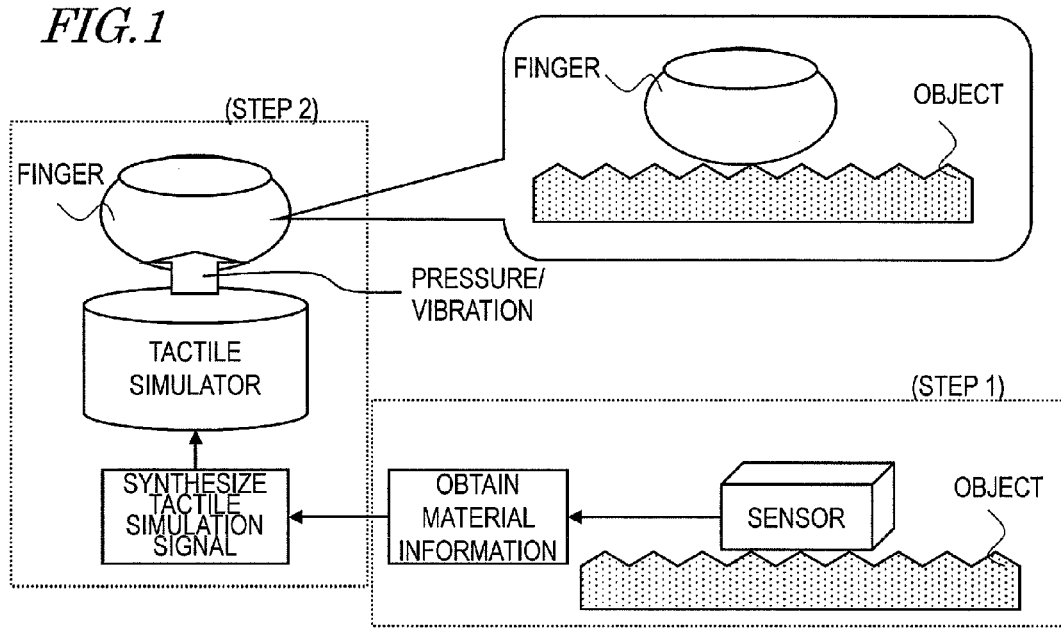
FIG. 1 illustrates a specific example of two processing steps 1 and 2 for synthesizing a tactile simulation signal.

An object of the present invention is to make a person get virtually the same tactile sensation as what he or she would get when touching an arbitrary material by simulating the frictional vibration to be produced on his or her finger pulp when he or she traced the object (i.e., the material) with his or her finger pulp.

Before preferred embodiments of the present invention are described, it will be described exactly on what principle the tactile feedback of the present invention works.

The frictional vibration to be produced when two materials rub against each other should be determined by those two materials M1 and M2 and their contact movement mv (i.e., exactly how they rub against each other), and therefore, can be represented as F (M1, M2, mv). In this case, the frictional vibration that has been obtained by rubbing the object T with a contact Mp to simulate the tactile sensation to be gotten by touching that object T is represented as Fp (T, Mp, mv1) and the frictional vibration to be displayed to the finger pulp is represented as Ff (T, Mf, mv2) (where Mf represents the material term of the finger pulp).

That is to say, an object of the present invention is to obtain Ff based on Fp. However, the materials M1 and M2 and the contact movement mv have a nonlinear relationship with respect to the frictional vibration and their relationship cannot be solved easily. However, if the contact movement mv1 in Fp is the same as the contact movement mv2 in Ff, only their material terms Mp and Mf are different between Fp and Ff. That is why in the following description, it will be described how to solve that nonlinear relationship under that condition. In that case, if mv1=mv2, then it means that the contact movement when the object is traced with a contact is the same as the contact movement of the frictional vibration to be displayed to the finger pulp. That is to say, in such a situation, the tactile sensation to be displayed to the finger pulp of a person who touches a tactile simulator should be gotten by him or her if the contact movement of the finger pulp on the simulator were exactly the same as the tracing movement of the contact on the object. To satisfy this condition, it is preferred that the finger pulp on the tactile simulator be stopped there. In general, it is called an "active contact" to get a tactile sensation by actively moving a part of a human body with respect to the object. On the other hand, it is called a "passive contact" to get a tactile sensation by making the object move to the contrary. And a primary object of the present invention is to make a tactile feedback by such a passive contact.

Hereinafter, it will be described how to settle the difference in frictional vibration Fp and Ff due to the difference between the material terms Mp and Mf. Suppose if a signal with a time width of 0 and with infinite energy (i.e., an impulse) is input to a system at a time 0, the output of that system is h(t). In that case, the output y(t) of the system, to which an arbitrary time wave signal x(t) has been input, is calculated by a so-called "convolution" computation represented by the following Equation (1):

$$y(t) = \int_{-\infty}^{\infty} x(t)h(t-\tau)d\tau \quad (1)$$

If X(f), Y(f) and H(f) are respectively obtained by subjecting the terms x(t), y(t) and h(t) on both sides of this Equation (1) to a Fourier transform, the Fourier transformed version of both sides of Equation (1) has a simple product form as represented by the following Equation (2):

$$Y(f) = X(f) \cdot H(f) \quad (2)$$

That is to say, this means that the relation between a time wave signal that has been input to a system and the output of that system can be represented as a product in the frequency space. The term H(f) representing the characteristic of the system is called a "transfer characteristic". By paying attention to such a relation, a system for outputting audio with a target characteristic by compensating for the characteristic of an audio recording environment has been designed and already used in practice. The basic idea of such a method is that if the transfer characteristic of the recording environment is H(f) and the target transfer characteristic of the audio is G(f), the audio to be recorded should be multiplied by the transfer characteristic Hr(f) that is calculated by the following Equation (3):

$$H_r(f) = G(f)/H(f) \quad (3)$$

According to the present invention, such an idea is applied to frictional vibration. That is to say, the frequency space representation of the frictional vibration produced between an object and a contact is identified by Vp(f) and supposed to be a virtual signal source S(f) that has been output through a system that has a transfer characteristic H(f) to be determined by the object and the contact. In this case, S(f) is called "virtual" because it is represented as being equivalent to the product of the signal source and the transfer characteristic H(f). This is also because a frictional vibration is produced by two materials that rub against each other but there is no independent signal source that produces the frictional vibration. In that case, Vp(f) can be represented by the following Equation (4):

$$V_p(f) = H(f) \cdot S(f) \quad (4)$$
$$= H_p(f) \cdot H_m(f) \cdot S(f)$$

In this example, however, the virtual transfer characteristic H(f) is supposed to be the product of respective independent virtual transfer characteristics of the contact and the object, which are identified by Hp(f) and Hm(f), respectively. Furthermore, if the signal source S(f) is supposed to be white noise, then it becomes a constant term. Thus, if the transfer characteristic of the object is multiplied by S(f), then Equation (4) can be described as:

$$V_p(f) = H_p(f) \cdot H'_m(f) \quad (5)$$

As to the frictional vibration Vf(f) that has been produced when the finger pulp and the object rub against each other, this relation is also satisfied as represented by the following Equation (6):

$$V_f(f) = H_f(f) \cdot H'_m(f) \quad (6)$$

Consequently, the vibration produced when the finger pulp and the object rub against each other can be calculated by the following Equation (7):

$$V_f(f) = H_f(f) \cdot \frac{H_p(f)}{H_p(f)} \cdot H'_m(f) \quad (7)$$
$$= H_f(f) \cdot \frac{1}{H_p(f)} \cdot V_p(f)$$

That is to say, if the respective virtual transfer characteristics Hf(f) and Hp(f) of the contact and the finger pulp have been obtained in advance, the frictional vibration Vf(f) to be produced when the object is traced with the finger pulp can be determined based on the frictional vibration Vp(f) that has been produced when the object is traced with the contact.

Next, it will be described how to calculate the virtual transfer characteristics Hp(f) and Hf(f) of the contact and finger pulp with respect to the frictional vibrations that are represented by Equations (5) and (6).

In sonics, for example, the transfer characteristic is generally obtained by calculating the response of a system to a reference signal (e.g., a unit impulse response). In frictional vibration, however, there is nothing that can be called a "reference signal" or a "reference material", and therefore, such a general method cannot be applied and no general solution can be obtained, either.

It is not quite clear exactly how the frictional vibration is produced but there should be two major factors involved (see Nakano and Kikuchi, "Conditional Expression for the Occurrence of Stick-Slip Motion Based on the Coulomb Friction Model (Part 1)", Journal of Japanese Society of Tribologists, Vol. 51, (2006), pp. 131-139, which will be referred to herein as "Nakano et al."). One of those two major factors is believed to be the frictional vibration that is produced because the friction characteristic functions as a negative attenuation when the relative velocity characteristic of a friction coefficient has a negative gradient. In that case, the frequency of such a vibration becomes close to the eigenfrequency of the substance. The other factor is so-called "Stick-Slip Motion" to be produced by iterative sticking and slipping of relative surfaces and is believed to be produced due to a difference between the coefficient of static friction and the coefficient of kinetic friction.

That is why these vibrations should have a power peak at a particular frequency and that power peak should appear at the eigenfrequency or other frequency that is specific to the substance. These power peaks can be predicted with some degree of accuracy based on a mechanical model and on detailed physical measurements on the material. To get that prediction done, however, some strict measuring environment that involves destructive inspection is required. For that reason, means for making such a measurement on the object for tactile feedback purposes should be a simpler one. Also, according to Equation (4), the transfer characteristic of the frictional vibration is supposed to be broken down into the product of two transfer characteristics that are unique to the substance. However, this supposition is not satisfied unless the contact movement is defined as described above. As for the period of the Stick-Slip motion disclosed in Nakano et al., for example, important parameters that determine that period of motion include terms signifying the relative velocity and perpendicular load of two objects. As these are parameters that define the contact movement, it can be said that the contact movement is an indispensable parameter for deriving Hp(f) and Hf(f). Meanwhile, as proved by the result of experiment in Konyo et al., the person can get multiple different kinds of tactile sensations in response to only a synthetic wave of two simple oscillations with different frequencies. In view of these considerations, even if such a high precision method for obtaining the transfer characteristics Hp(f) and Hf(f), in which a power spectrum is obtained on a frequency basis to shape the oscillating waveform, is not adopted, tactile feedback should be done with some accuracy just by reproducing the distribution of frequencies corresponding to high powers. With these points taken into account, according to the present invention, taken as approximate tactile feedback approaches based on the idea of transfer characteristic described above are the following four policies (1) through (4):

(1) the contact movement is taken into account to obtain Hp(f) and Hf(f);
(2) Hp(f) and Hf(f) are obtained statistically based on multiple frictional vibrations Vp(f) and Vf(f) that have been produced by rubbing various objects;
(3) in making the tactile feedback, the power spectrum does not have to be obtained at every frequency but just characteristic power peaks need to be reproduced; and
(4) to further clarify the power peak conditions, measurable physical quantities are also used.

Following these policies, according to this preferred embodiment, tactile feedback is made by replacing the transfer functions Hp(f) and Hf(f) with sets of power peaks.

Hereinafter, specific preferred embodiments of a tactile feedback apparatus according to the present invention will be described with reference to the accompanying drawings.

Embodiment 1

As a method for performing the basic function of the present invention, a signal conversion method and a frictional vibration generating method will be described as a first preferred embodiment of the present invention. According to this preferred embodiment, the patterns in which the contact produces frictional vibrations are learned in advance, thereby causing a realistic tactile sensation of any material on a person's finger pulp.

Figure 2:
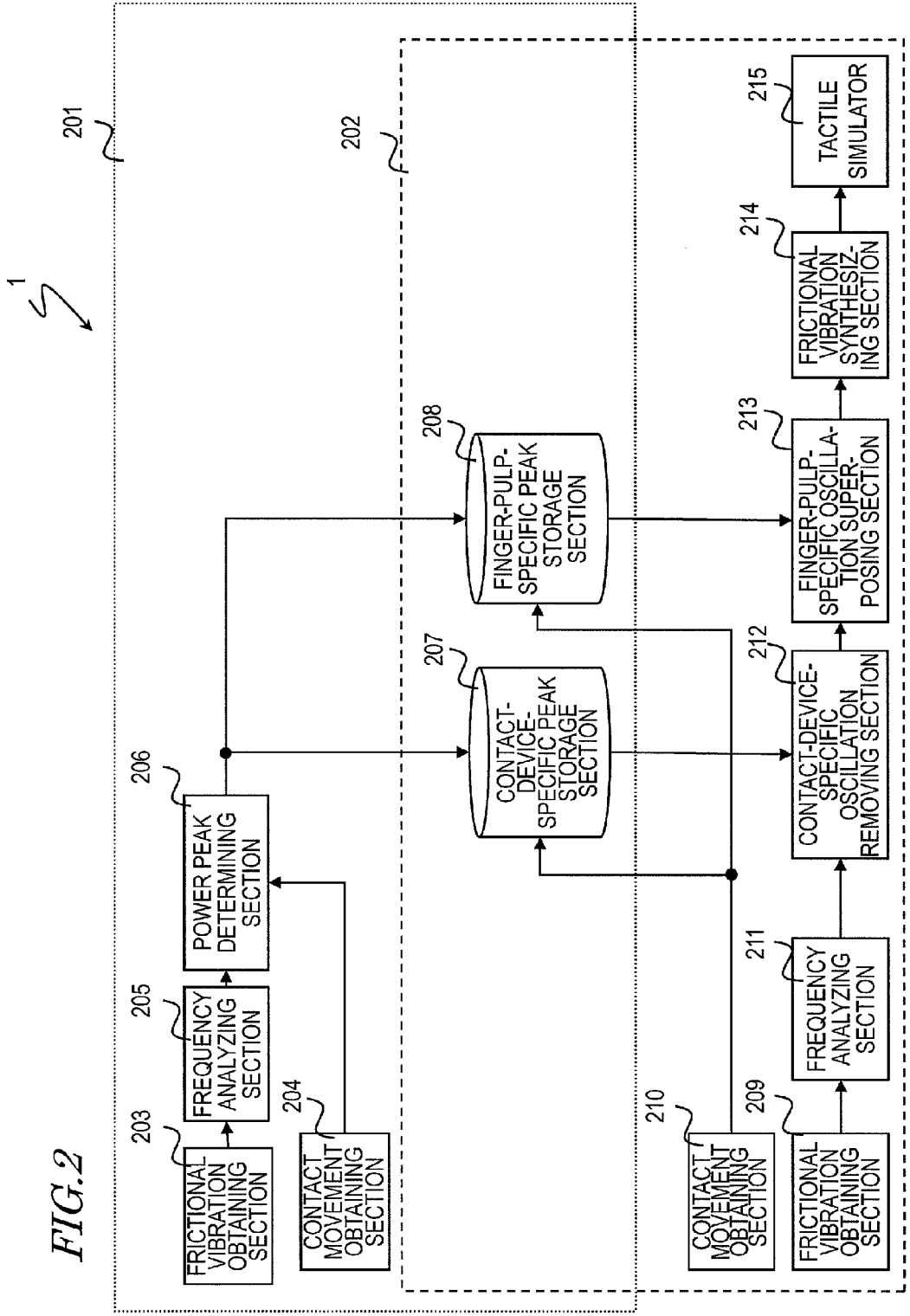
FIG. 2 is a block diagram illustrating a tactile feedback apparatus 1 as a first preferred embodiment of the present invention.

FIG. 2 is a block diagram illustrating a tactile feedback apparatus 1 as a first preferred embodiment of the present invention. This tactile feedback apparatus 1 has two major sections, which will be referred to herein as a power peak learning section 201 and a tactile feedback performing section 202, respectively.

In accordance with Equations (5) and (6) in which the frictional vibration produced by rubbing is supposed to be equivalent to the product of a signal source and a transfer system, the power peak learning section 201 determines parameters representing Hp(f) and Hf(f) by learning. In this case, Hp(f) is an oscillation component of the frictional vibration produced when a contact device and an object rub against each other. Hp(f) is an oscillation component that does not depend on the object but that is specific to the contact device. In this first preferred embodiment, Hp(f) is approximated with a power peak that is specific to the contact device (which will be referred to herein as a "contact-device-specific power peak"). On the other hand, Hf(f) is an oscillation component of the frictional vibration produced when a person's finger pulp and the object rub against each other. Hf(f) is an oscillation component that does not depend on the object but that is specific to the finger pulp. In this first preferred embodiment, Hf(f) is approximated with a power peak that is specific to the finger pulp (which will be referred to herein as a "finger-pulp-specific power peak"). As used herein, the "power peak" refers to a local maximum point of a power spectrum representing the frictional vibration where a particular condition for regarding it as resonance involved with the natural vibration of the material is satisfied (see the dotted ellipses shown in FIG. 8). The processing step of obtaining these parameters using the learning section 201 will be referred to herein as a "learning step".

Based on the frictional vibration that has been produced by tracing the object of tactile feedback with the contact device and on the information about the respective power peaks of the contact device and the finger pulp that have been located by the power peak learning section 201 and following Equation (7), the tactile feedback performing section 202 synthesizes the frictional vibration and displays it to the finger pulp. Such a processing step will be referred to herein as a "performing step".

The power peak learning section 201 includes a frictional vibration obtaining section 203, a contact movement obtaining section 204, a frequency analyzing section 205, a power peak determining section 206, a contact-device-specific peak storage section 207 and a finger-pulp-specific peak storage section 208.

It should be noted that in FIG. 2, the power peak learning section 201 and the tactile feedback performing section 202 partially overlap with each other. This means that the contact-device-specific peak storage section 207 and the finger-pulp-specific peak storage section 208 in the overlap range may be physically included in either the power peak learning section 201 or the tactile feedback performing section 202. In this preferred embodiment, the contact-device-specific peak storage section 207 and the finger-pulp-specific peak storage section 208 are physically included in the power peak learning section 201. When performing the tactile feedback, the tactile feedback performing section 202 needs to use the contact-device-specific peak storage section 207 and the finger-pulp-specific peak storage section 208 to remove and overlap the peaks.

Hereinafter, the flow of the learning processing step to get done by the power peak learning section 201 will be outlined along with the functions of respective components of the power peak learning section 201.

The frictional vibration obtaining section 203 causes friction between the object and the contact device or between the object and the finger pulp by tracing the object and then outputs a time wave signal representing the frictional vibration. On the other hand, the contact movement obtaining section 204 outputs a signal representing the relative velocity or the pressing force of the tracing movement that has been done by the frictional vibration obtaining section 203 between the contact device and the object or between the finger pulp and the object. The tracing or pressing movement can be done using the XYZ three-dimensional plotter shown in FIG. 6 (and will be described later), for example. The frequency analyzing section 205 performs frequency analysis on the output of the frictional vibration obtaining section 203, thereby transforming it into information about a power spectrum, for example.

The power peak determining section 206 processes statistically the respective outputs of the frequency analyzing section 205 and the contact movement obtaining section 204 that have been obtained by making various kinds of contact movements on a variety of objects. And then the power peak determining section 206 extracts some of the power peaks from the power spectrum of the frictional vibration on a contact movement basis if those peaks do not depend on the objects.

The contact-device-specific peak storage section 207 stores the power peak information, which has been extracted on a contact movement basis by the power peak determining section 206 from the frictional vibration between the contact device and the object for each quantity measured for the object, in association with the contact movement information and the quantity measured for the object. On the other hand, the finger-pulp-specific peak storage section 208 stores the power peak information, which has been extracted on a contact movement basis by the power peak determining section 206 from the frictional vibration between the finger pulp and the object for each quantity measured for the object, in association with the contact movement information and the quantity measured for the object.

Meanwhile, the tactile feedback performing section 202 includes another frictional vibration obtaining section 209, another contact movement obtaining section 210, another frequency analyzing section 211, a contact-device-specific oscillation removing section 212, a finger-pulp-specific oscillation superposing section 213, a frictional vibration synthesizing section 214 and a tactile simulator 215.

Hereinafter, the flow of the performing processing step to get done by the tactile feedback performing section 202 will be outlined along with the functions of respective components of the tactile feedback performing section 202.

The frictional vibration obtaining section 209 outputs a time wave signal representing a frictional vibration that has been produced by tracing the object of tactile feedback with the contact device. On the other hand, the contact movement obtaining section 210 outputs a signal representing the relative velocity or the pressing force of the tracing movement between the object and the contact device. The frequency analyzing section 211 performs frequency analysis on the output of the frictional vibration obtaining section 209, thereby transforming it into information about a power spectrum, for example. The contact-device-specific oscillation removing section 212 removes the contact-device-specific power peaks from the power spectrum information provided by the frequency analyzing section 211. In this case, the power peaks to remove are determined by searching the contact-device-specific peak storage section 207 based on the output of the contact movement obtaining section 210. Furthermore, the finger-pulp-specific oscillation superposing section 213 superposes the finger-pulp-specific peaks on the output of the contact-device-specific oscillation removing section 212. In this case, the power peaks to superpose are determined by searching the finger-pulp-specific peak storage section 208 based on the output of the contact movement obtaining section 210. The frictional vibration synthesizing section 214 restores the output of the finger-pulp-specific oscillation superposing section 213 into the original time wave signal. And the tactile simulator 215 simulates the target tactile sensation by displaying the synthetic signal supplied from the frictional vibration synthesizing section 214 as a vibration stimulus.

Hereinafter, the respective sections will be described in detail. In the learning step, first of all, by tracing a number of predetermined objects with a particular contact device, the frictional vibration obtaining section 203 obtains a time wave signal (as a voltage waveform, for example). To obtain a time wave signal from the frictional vibration between the contact device and the object, either a piezoelectric element such as a polyvinylidene fluoride (PVDF) film or an elastic body may be used as the contact device. And the signal can be obtained by either attaching the piezoelectric element to around its contact surface or embedding the piezoelectric element.

Figure 3:
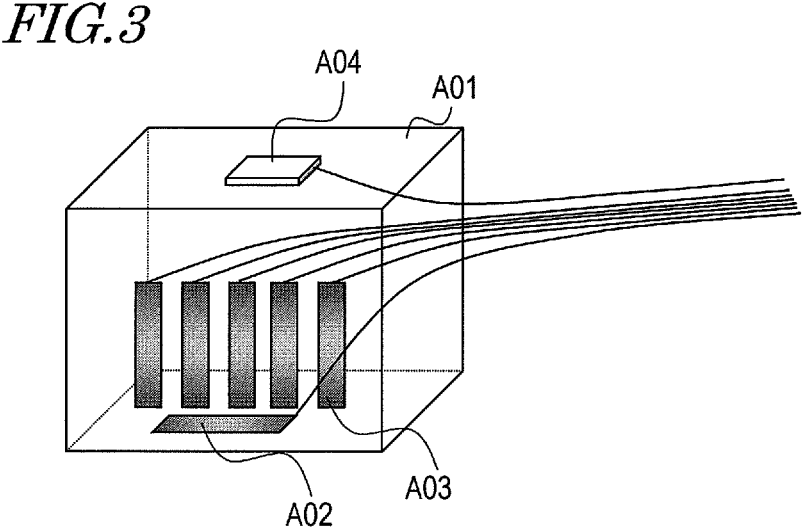
FIG. 3 illustrates a specific example of a frictional vibration obtaining section 203.

FIG. 3 illustrates a specific example of the frictional vibration obtaining section 203. An elastic body A01 is rubbed against the object, thereby producing a frictional vibration, which is detected, and output as an electrical signal, by a lot of sensors A02 and A03 such as strain gauges. In FIG. 3, also illustrated is an acceleration sensor A04 to be described later.

Figure 4:
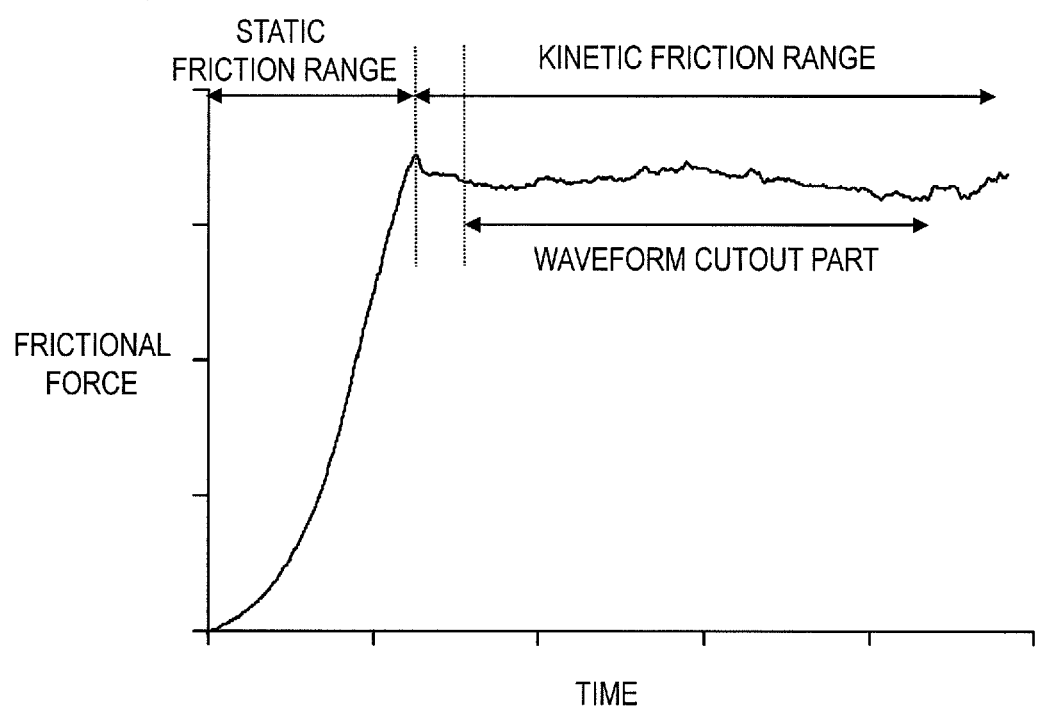
FIG. 4 shows an exemplary oscillating waveform of the frictional force that has been produced by the elastic body shown in FIG. 3.

FIG. 4 shows an exemplary oscillating waveform of the frictional force that has been produced by the elastic body shown in FIG. 3. As shown in FIG. 4, if the object is traced with the contact device, the object and the contact device stick to each other due to static friction in the initial stage. However, once the tensile force in the shear direction exceeds the maximum static friction force, contact movement is started by kinetic friction. As used herein, the "frictional vibration" refers to a vibration in the kinetic friction state. From the time wave signal such as the one shown in FIG. 4, the frictional vibration obtaining section 203 automatically cuts out a stabilized part of the waveform after a predetermined amount of time has passed since the kinetic friction state was entered.

While the frictional vibration obtaining section 203 obtains the oscillating waveform, the contact movement obtaining section 204 collects information about the relative movement (i.e., the contact movement) that has been produced due to the contact between the contact device and the object. As used herein, the contact movement information includes parameters defining the contact movement such as the relative velocity v between the contact device and the object and the force F that presses the contact device against the object.

In the exemplary frictional vibration obtaining section 203 shown in FIG. 3, the acceleration sensor A04 calculates the contact velocity of the contact device based on the integral value of the movement of the contact device. In this manner, information about the movement of the contact device can be obtained. The acceleration sensor A04 is a specific example of the contact movement obtaining section 204. Meanwhile, the sensors A02 are arranged so as to measure the force that presses the contact device against the material. For example, the sensors A02 output the DC components of the frictional vibration as the pressing force F.

As described above, even if the same combination of contact device and object have been rubbed against each other, the magnitude of the frictional vibration changes according to the contact movement. That is why information about frictional vibrations should be collected in advance with respect to various kinds of contact movements.

Particularly, according to the present invention, to make a person get virtually the same tactile sensation on his or her finger pulp as what is produced by tracing the object with the contact device, it is preferred that information about the frictional vibrations be collected in advance as for contact movements corresponding to various tracing movements that a person generally takes to get a tactile sensation of the object. In addition, it is also preferred that a group of power peaks of the transfer function Hp(f) of the contact device be obtained for each of those various kinds of contact movements. That is to say, information about the frictional vibration is preferably obtained by applying the same set of multiple different contact movements to each of a number of objects.

Figure 6:
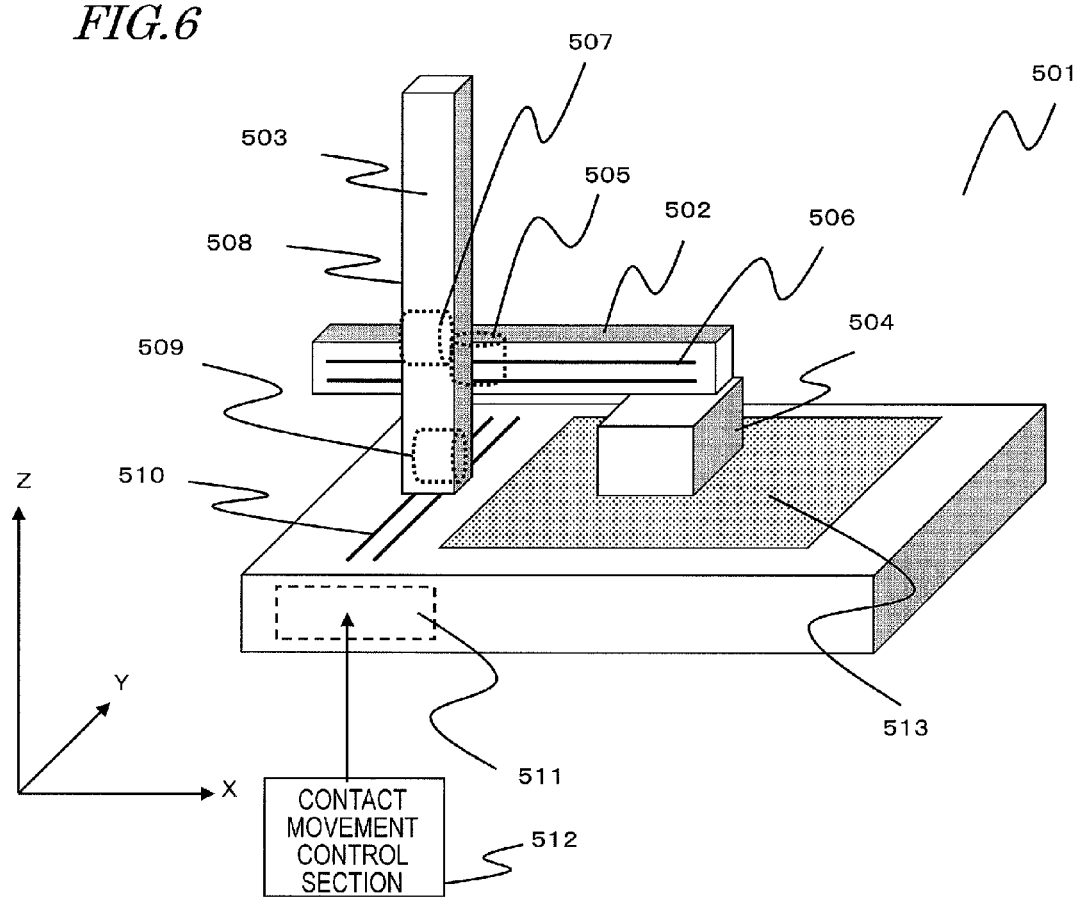
FIG. 6 illustrates an exemplary configuration for an XYZ three-dimensional plotter 501 that has functions corresponding to those of the frictional vibration obtaining section 203 and a contact movement obtaining section 204.

That is why in the process of getting information about multiple frictional vibrations v by tracing the object with the contact device, it is effective to get that information by controlling the contact movement with an XYZ three-dimensional plotter, for example. FIG. 6 illustrates an exemplary configuration for an XYZ three-dimensional plotter 501 that has functions corresponding to those of the frictional vibration obtaining section 203 and the contact movement obtaining section 204. By using this XYZ three-dimensional plotter 501, information about the frictional vibration and information about the contact movement can be obtained in the following manner.

The XYZ three-dimensional plotter 501 obtains information about the frictional vibration produced between the object and the contact device by moving the contact device in predefined patterns. For that purpose, the XYZ three-dimensional plotter 501 holds a sensor portion 504 with the contact device with two supporting poles 502 and 503. Specifically, the supporting pole 502 is driven by a motor 505 so as to move in the X-axis direction on a rail 506 and is also driven by another motor 507 so as to move in the Z-axis direction on another rail 508. On the other hand, the supporting pole 503 is driven by still another motor 509 to move in the Y-axis direction on another rail 510.

In accordance with a control signal from a contact movement control section, a motor control section 511 controls the running of the motors 505, 507 and 509 and moves the sensor section 504, thereby producing a frictional vibration between the sensor section 504 and the object 513. The sensor section 504 includes a shear stress sensor for obtaining information about the frictional vibration produced between the contact device and the object and a normal force sensor for measuring the pressing force against the object. By using those sensors, the sensor section 504 can obtain information about the pressing force F of the contact movement. In addition, based on the relation between the magnitude of the movement in the Z direction that has been produced by the motor 507 and the pressing force F, the sensor section 504 can also calculate the modulus of elasticity of the object as well.

Also, based on the magnitudes of movement in the X and Y directions per unit time, which is included in the control signal information provided by the contact movement control section 512, the relative velocity v between the contact device and the object can be calculated. In this example, the contact movement is supposed to be determined based on the relative velocity v between the contact device and the object and the pressing force F. However, it is no less effective to use velocities vx and vy or accelerations ax and ay on the basis of acceleration a or directions of movement X and Y.

According to the method described above, every object is supposed to be inspected with the same contact movement. However, even if there is a certain degree of variation in contact movement, a variation in frictional vibration can also be ironed out using a pre-established model. Such a model may be either a physical model on frictional vibrations or a model that has been statistically generated based on a variety of objects and various kinds of contact movements in order to indicate how the power peaks change with a variation in contact movement or in a physical quantity measured with respect to the object.

A number of time wave signals, each of which is obtained as described above, are output for respective combinations of the object to trace and contact movement representing how to trace it. If a frictional vibration produced by a combination of the object j and the kind of contact movement i is represented by v (i, j), then v (1, 1), . . . and v (m, n) are obtained, where m denotes the number of objects and satisfies m≥1 and n denotes the number of different kinds of contact movements and satisfies n≥1. Each of these m×n time wave signals is transformed by the frequency analyzing section 205 into a frequency space expression. This means obtaining the power spectrum of a signal, for example. For that purpose, time wave signals are generally sampled at regular time intervals and then subjected to a discrete Fourier transform by adopting a fast Fourier transform (FFT) or any other appropriate method.

Figure 5:
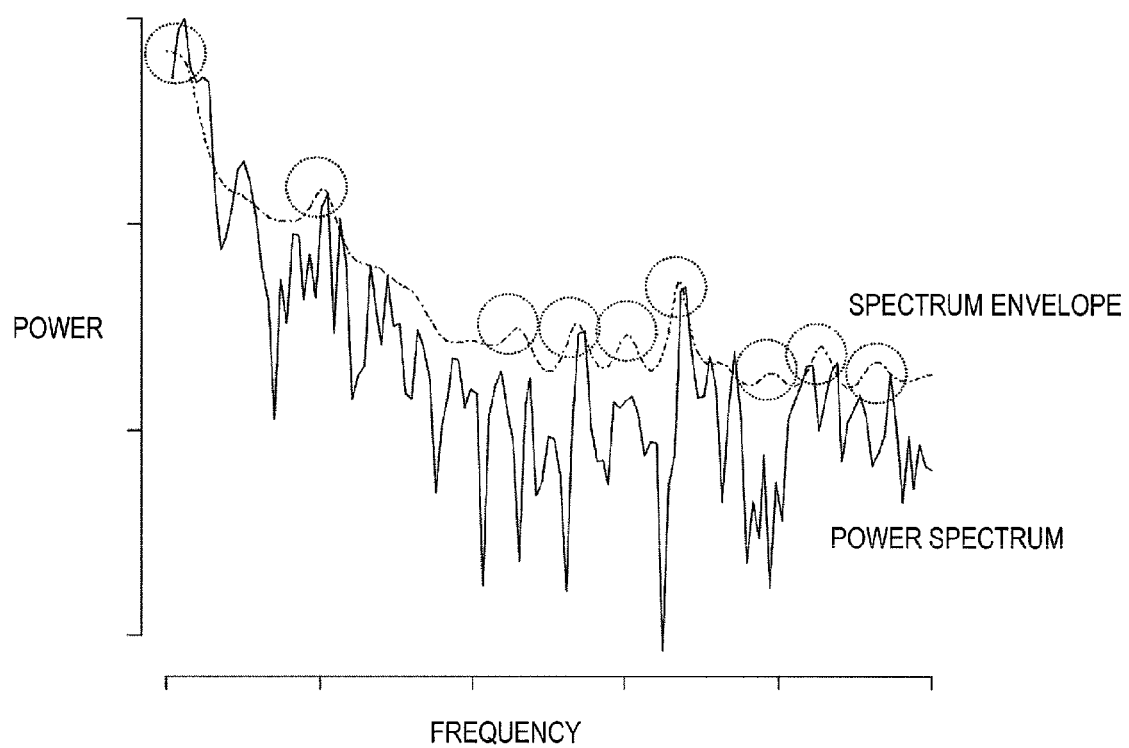
FIG. 5 shows an exemplary power spectrum of the frictional vibration.

FIG. 5 shows an exemplary power spectrum of the frictional vibration by the solid curve. As shown in FIG. 5, in the power spectrum of a frictional vibration, the power generally varies significantly with the frequency. However, the frictional vibration is a periodic oscillation that has a power peak at the natural frequency of a material, for example. Also, considering that it is important to reproduce a characteristic power peak when making a tactile feedback, such a variation in power accompanying a tiny variation in frequency is of no great interest.

That is why a spectrum envelope could be obtained by a technique such as linear predictive coding (LPC), which is often used to make a frequency analysis on speech (see Shikano, Nakamura and Ise, "Digital Signal Processing on Speech and Audio Information", Shokodo, Co., Ltd., pp. 10-16, 1997), and could be used as a result of the frequency analysis. In FIG. 5, a spectrum envelope that was obtained by such a technique is shown by the dashed curve. The results obtained by subjecting the time wave signals to such a frequency analysis will be identified herein by V (1, 1), . . . and V (m, n).

If a set of all elements of the variables is represented with wild card "*", then a set of the results of frequency analysis that has been carried out on every possible combination of m objects and n different kinds of contact movements can be represented as V (*, *), where * is one arbitrary letter. The power peak determining section 206 extracts contact-device-specific power peaks.

Figure 7:
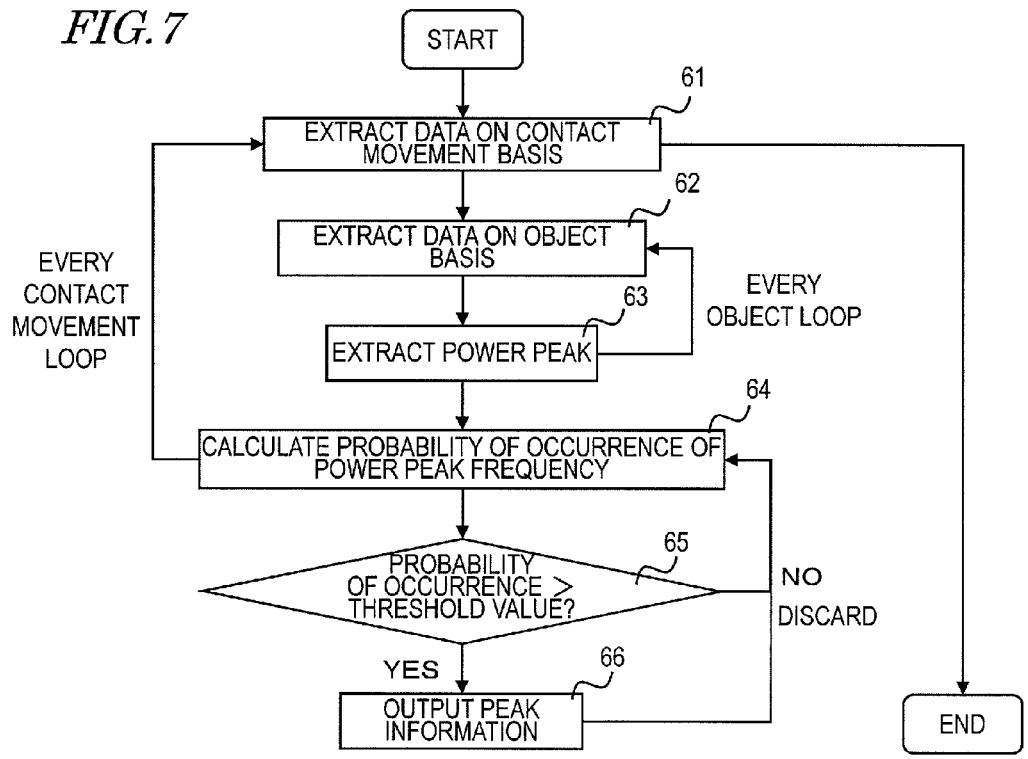
FIG. 7 is a flowchart showing the procedure of power peak extraction processing.

FIG. 7 is a flowchart showing the procedure of the power peak extraction processing. First, in the step 61 of extracting data on a contact movement basis, the results of frequency analysis V (*, *) are extracted for each of the n different kinds of contact movements. Supposing data is now being extracted for the $i^{th}$ contact movement, every one of the results V (*, i) is extracted. Next, in the step 62 of extracting data on an object basis, the output V (j, i) with respect to an object j is further extracted from the results V (*, i). As described above, V (j, i) may be the data shown in FIG. 5, for example. Subsequently, in the power peak extracting step 63, the frequencies and powers of local peaks (i.e., location maximum points) are extracted from V (j, i). In FIG. 5, the local peaks extracted are indicated by small dotted circles. Usually, a number of such peaks are extracted. In this case, the local peaks may be extracted under some conditions specified. For example, only local peaks, of which the power levels and the resonance Q values satisfy predetermined conditions, may be extracted. By adding such conditions for extraction, only more outstanding peaks are extracted, and the other local peaks, which either are not essential for tactile feedback or can be regarded as noise, are negligible. And the local peaks extracted this way are defined to be power peaks. Their information is supposed to be described as in the following Expression (8):

$$\theta_f(k|j,i)$$

$$\theta_p(k|j,i) \qquad (8)$$

In Expression (8), the index k represents a power peak with the $k^{th}$ lowest frequency of frictional vibration with respect to the $j^{th}$ and $i^{th}$ contact movements of the object, θf represents the frequency of the power peak, and θp represents the power of the power peak. In this case, θ is extracted from every one of the m objects with respect to the frictional vibrations V(*, i) of the same contact movement i. Then, in the next step 64 of calculating the probability of occurrence of the power peak frequency with respect to the {θf} set thus obtained, the number of objects i, for which k satisfies the following Equation (9), is counted with respect to each frequency fx included in the set {θf}:

$$\theta_f(k|j,i)=f_x \qquad (9)$$

For example, if m' out of the m objects have k that satisfies this Equation (9), then the probability of occurrence of the power peak frequency fx is given by the following Equation (10):

$$P(f_x \mid i) = \frac{m'}{m} \qquad (10)$$

Furthermore, by calculating the average of θp with respect to every possible combination of the object j and the index k that satisfy Equation (9), the average power of the power peaks is also obtained by the following Equation (11):

$$\overline{\theta_p}(f_x \mid i) = \frac{1}{m'} \sum_{k,j} \theta_p(k \mid j, i) \qquad (11)$$

In addition, it is also effective to obtain not only the average power but also the average of resonance Q values by carrying out similar calculations. In Equation (9) representing a condition for calculating the probability of occurrence, θf should be exactly the same as fx. However, it is also effective to set a certain range for the frequencies. For example, with respect to a coefficient α representing a window width, the following Inequality (12)

$$(1-\alpha)f_x \leq \theta_f(k|j,i) \leq (1+\alpha)f_x \quad (12)$$

may also be applicable effectively. In that case, a unique power peak frequency cannot be determined. That is why with the average of θf calculated for every possible combination of the object j and the index k that satisfy Inequality (12), the following Equation (13) may be used, for example:

$$\overline{f_x} = \frac{1}{m'} \sum_{k,j} \theta_f(k|j,i) \quad (13)$$

Furthermore, the frictional vibration is considered to be the expression of each one of multiple resonances included in a system. And such resonance is supposed to occur with probability variation at a particular frequency or peak power. In that case, the frictional vibration that has been subjected to the frequency analysis becomes an observed value of this system. Thus, the probability P (fx|i) can also be obtained by estimating the parameters within the framework of statistical learning such as most likelihood method or Bayes learning. Also, if the frictional vibration is understood within such a framework, the modulus of elasticity E and coefficient of friction μ of the object, which can be factors that determine the power peak, can also be introduced into the model. As a result, a more detailed probability distribution can be estimated in the form of P (fx|i, E), P (fx|i, μ) or P (fx|i, E, μ), for example. Next, in the peak extraction decision step 65, it is determined whether or not each probability distribution P (fx|i) has a probability that is equal to or greater than a predetermined threshold value. If the answer is YES, the power peak frequency fx, its number (11) of average powers, its average Q value and the relative velocity v and pressing force F associated with the contact movement i are output in the next peak information output step 66. Otherwise, that probability distribution is discarded. It should be noted that if such a probability of occurrence of power peaks is obtained as a probability distribution, it is also effective to output an average, a variance and other parameters representing the distribution.

Figure 8:
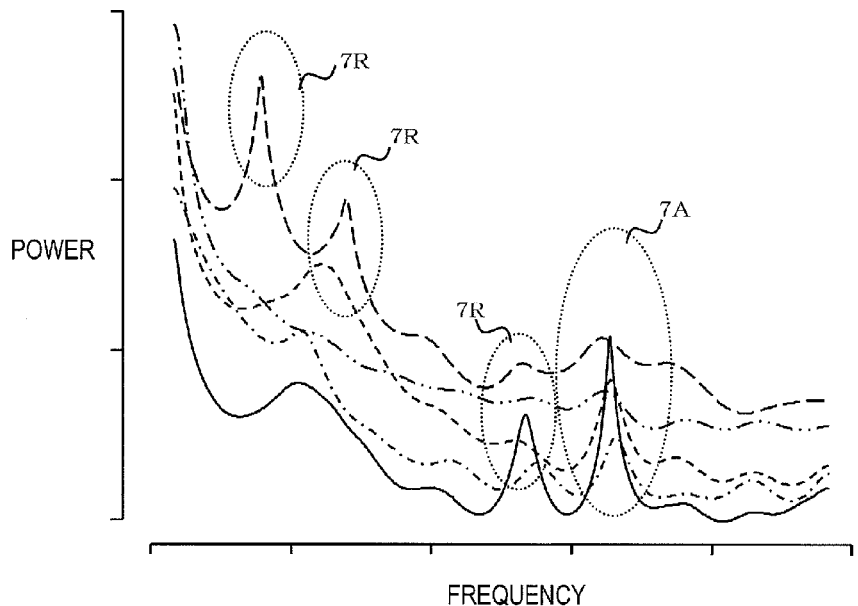
FIG. 8 shows exemplary results of frequency analysis on frictional vibrations that were detected from multiple objects with the same contact device moved in exactly the same pattern.

FIG. 8 shows exemplary results of frequency analysis on frictional vibrations that were detected from multiple objects with the same contact device moved in exactly the same pattern. As shown in FIG. 8, the power peaks that occurred can be classified into power peaks that always occurred in each and every one of the objects (i.e., the peaks encircled with the dotted circle 7A) and power peaks that varied from one object to another (i.e., the peaks encircled with the dotted circles 7R). By determining the number of probabilities of occurrence of the power peaks (i.e., 10 in this case) and comparing it to an appropriate threshold value, the power peaks encircled with the circle 7A are output from the power peak determining section 206 and the other power peaks encircled with the circles 7R are discarded. By repeatedly carrying out this series of processing steps on each of the n different kinds of contact movements, power peak information can be obtained on a contact movement basis. And such processing is performed on every fx in the set {θf} and the same series of processing steps 62 through 66 are repeatedly carried out on each and every one of the n different kinds of contact movements.

Those power peaks that have been output on a contact movement basis always occur in each and every object when the frictional vibration is produced by rubbing the contact device and the object against each other. That is why those power peaks are contact-device-specific power peaks, which correspond to the transfer function Hp(f) of the contact device in Equation (5). That is why the output of the power peak determining section 206 is stored in the contact-device-specific peak storage section 207.

FIG. 9 shows what may be stored in the contact-device-specific peak storage section 207. In the example shown in FIG. 9, the power peak frequency and average power, which are the outputs of the power peak determining section 206, are stored in association with the relative velocity v and pressing force F representing the contact movement. As already described with respect to the processing flow for the power peak determining section 206, multiple power peak frequencies could be extracted with respect to the same contact movement. Examples of specific numerical values that can be used in such a situation are shown on the first and second rows of FIG. 9. As described above, pieces of information to be stored about the contact movement include not just the pieces of information shown in FIG. 9 but also relative accelerations and individual records of the X and Y direction components of the velocities and accelerations as well. It is also effective to store, as the power peak information, the average of the resonance Q values of the power peaks, not just the peak frequency and its average power. Furthermore, if the distribution of probabilities of occurrence has been obtained by the power peak determining section 206, not just the frequencies and their average power but also parameters that define the probability distribution (such as their variance) are stored as well.

The contact-device-specific peaks, which are generated by tracing the object with the contact device, can be extracted and stored as described above.

As to how to extract and store the finger-pulp-specific peaks that are generated by tracing the object with a finger pulp, the processing is performed in essentially the same procedure as the one described above. Specifically, the subject traces m different objects with his or her finger pulp to make n different kinds of predetermined contact movements. Information about the frictional vibrations produced then is obtained by the frictional vibration obtaining section 203. At the same time, information about the contact movements in such a situation is collected by the contact movement obtaining section 204. The frictional vibration signal is transformed by the frequency analyzing section 205 into a signal in the frequency space. Next, using the frequency-analyzed frictional vibration signal that has been obtained for every possible combination of the m different objects and the n different kinds of contact movements, the power peak determining section 206 extracts power peaks that occurred highly frequently irrespective of the object, and then stores those peaks in the finger-pulp-specific peak storage section 208. The power peak information stored there is about the power peaks that always occurred in each and every object whenever the object was traced with the finger pulp. That is why those peaks can be regarded as finger-pulp-specific peaks, which correspond to the finger pulp's transfer characteristic Hf(f) in Equation (6). Those finger-pulp-specific peaks may also be stored in the same way as the contact-device-specific peaks shown in FIG. 9. Nevertheless, since the contact-device-specific peaks and the finger-pulp-specific peaks should be clearly distinguished from each other, information about one kind of peaks and information about the other kind of peaks should be separately stored in two different tables. Or flag items may be added so that those two kinds of peaks can be easily distinguished from each other.

In this manner, the finger-pulp-specific peak extraction and storage processing may be carried out in almost the same way as the contact-device-specific peak extraction and storage processing. However, there is a problem to overcome. That is, when information about the finger pulp's frictional vibration is obtained in the learning step, it is difficult to directly obtain the information about the frictional vibration produced on the finger pulp surface. Specifically, if a sensor such as a piezoelectric film were attached to the finger pulp surface to get information about the frictional vibration that has been produced on the finger pulp surface, then friction would be produced between the film sensor, not the finger pulp, and the object and the frictional vibration itself would be different what should be measured, which is meaningless. Likewise, even if the sensor were attached very close to the point of contact between the finger pulp and the object so as to be out of contact with the object, the frictional vibration measured would also be different from what has been produced on the finger pulp surface. The same can be said even if an artificial finger, of which the response to a frictional vibration could be regarded as being equivalent to the finger pulp's, were made and if a sensor were embedded close to the contact surface of that contact device to get information about the frictional vibration. This is because it is actually impossible to make a contact device, every property of which is quite the same as a human finger's in terms of elasticity, friction property, shape, structure and so on.

In view of these considerations, it will be described how to get information about the frictional vibration that has been produced on the finger pulp surface by overcoming the problem described above to arise during the finger-pulp-specific peak learning. To overcome that problem, it is effective to determine the transfer characteristic from the finger pulp surface to the point where information about the finger pulp vibration needs to be obtained and estimate the vibration at the surface of the finger pulp by using its inverse characteristic as disclosed by Iwamoto, Hoshi and Shinoda in "Tactile Sensing Based on Human-Finger Vibration Measurement", Proceedings of 23$^{rd}$ Sensing Forum, (2006), pp. 285-288.

FIGS. 10(a) and 10(b) illustrate an exemplary method for estimating the vibration at the surface of a finger pulp. First, as shown in FIG. 10A, in determining the transfer characteristic from the finger pulp surface to the point where information about the finger pulp vibration needs to be obtained, a reference vibration such as a unit impulse is generated by a reference vibration generating section 91 that is in contact with the finger, thereby producing a vibration on the finger pulp. This vibration is transferred on the finger and then detected as a vibration signal by a finger pulp vibration obtaining section 92, which is in contact with the finger at a different point from the reference vibration generating section 91. Since the influence produced by the finger pulp vibration obtaining section 92 should be as small as possible, information about the finger pulp vibration is preferably obtained using a needle-like contact device, for example. Also, considering the influences of vibration damping and noise, the point of contact between the finger pulp vibration obtaining section 92 and the finger should be as close to the finger pulp's contact surface as possible. By making a computation on the vibration produced by the reference vibration generating section 91 and on the vibration signal that has been obtained by the finger pulp vibration obtaining section 92, the transfer function G(f) from the finger pulp contact surface to the point of attachment of the finger pulp vibration obtaining section 92 can be determined. For example, if the vibration has been produced by the reference vibration generating section 91 using a unit impulse, the target transfer function is G(f), which is calculated by subjecting the signal waveform g(t) that has been obtained by the finger pulp vibration obtaining section 92 to a Fourier transform.

In getting information about the frictional vibration that has been produced by tracing an object with a finger pulp, the reference vibration generating section 91 is removed and the object 93 is arranged there instead as shown in FIG. 10B. As a result, V(f) is obtained by subjecting the frictional vibration that has been produced on the finger pulp surface by tracing the object with the finger pulp to a Fourier transform as represented by the following Equation (14):

$$V(f) = \frac{1}{G(f)} V'(f) \tag{14}$$

In Equation (14), V'(f) is obtained by subjecting a time wave signal, which has been obtained by the finger pulp vibration obtaining section 92 by tracing the object with a finger pulp, to a Fourier transform. Once the frictional vibration V(f) that is represented in the frequency space has been obtained, the power peak is determined in quite the same procedure by the frequency analyzing section 205 and its following sections that are provided to detect the frictional vibration between the contact device and the object. And that power peak becomes the finger-pulp-specific power peak.

In this manner, the power peak learning section 201 performs the learning step. Hereinafter, it will be described how the tactile feedback performing section 202 shown in FIG. 2 carries out the performing step for simulating a tactile sensation of object T on a tactile simulator using a frictional vibration that has been produced by tracing the object T with a contact device.

The frictional vibration obtaining section 209 traces the object T of tactile feedback with a contact device, thereby outputting a time wave signal vp(t) representing the magnitude of the frictional vibration. When the object is traced with a contact device, an XYZ three-dimensional plotter just like the one shown in FIG. 6 may be used. Alternatively, a tracer with a built-in contact device may be provided and held in hand to trace the object.

FIG. 11 illustrates an exemplary configuration for such a tracer 101, which includes a contact device 102, a pressing force sensor 103, a position sensor 104 and a signal cable 105.

The contact device 102 contacts with the object T and outputs a time wave signal vp(t) representing the magnitude of the frictional vibration produced. The pressing force sensor 103 measures the force with which the contact device is pressed against the object. The position sensor 104 measures the magnitude of relative movement in the X, Y and Z directions between the contact device and the object. And the signal cable 105 passes the output signals of these members.

As already described herein about the principle of the present invention, the tactile simulator 215 simulates the tactile sensation that would be gotten by the person on his or her finger pulp if he or she traced the object T by making the same contact movement as what has been made by the contact device on the object T. For that reason, the contact movement to be made by the frictional vibration obtaining section 209 to get information about the frictional vibration should be determined with the tactile sensation to simulate taken into account. Consequently, it is preferred to determine, according to the application of the tactile feedback, whether the contact movement should be made in a controlled manner using the tracer shown in FIG. 6 or in a more natural pattern with the tracer shown in FIG. 11 held in hand.

As in the learning step, the time wave signal vp(t) that has been output from the frictional vibration obtaining section 209 is also classified into a static friction range and a kinetic friction range, and a stabilized part of the waveform in the kinetic friction range is cut out after a predetermined amount of time has passed since the kinetic friction state was entered (see FIG. 4). This time wave signal is sampled and transformed into a power spectrum Vp(f) by the frequency analyzing section 211 using a technique such as a discrete Fourier transform. Also, to restore the spectrum into the original time wave signal afterward, the phase information should also be retained.

Just like the contact movement obtaining section 204 for use to perform the learning step, the contact movement obtaining section 210 outputs the relative velocity v and the pressing force F between the contact device and the object to represent the contact movement of the contact device that has been detected by the frictional vibration obtaining section 209. In FIG. 11, illustrated is an exemplary configuration for that contact movement obtaining section 204, which is made up of the pressing force sensor 103 and the position sensor 104. In this example, the pressing force F is obtained based on the output of the pressing force sensor 103 and the magnitudes of movement in the X and Y directions per unit time and the relative velocity v are calculated based on the output of the position sensor 104.

Next, from the power spectrum Vp(f) of the frictional vibration that has been obtained as the output of the frequency analyzing section 211, the contact-device-specific oscillation removing section 210 removes the contact-device-specific power peaks corresponding to the transfer characteristic Hp(f) of the contact device in Equation (5). Information about the power peaks to remove is obtained by searching the contact-device-specific peak storage section 207 with the contact movement information (v, F).

Figure 12:
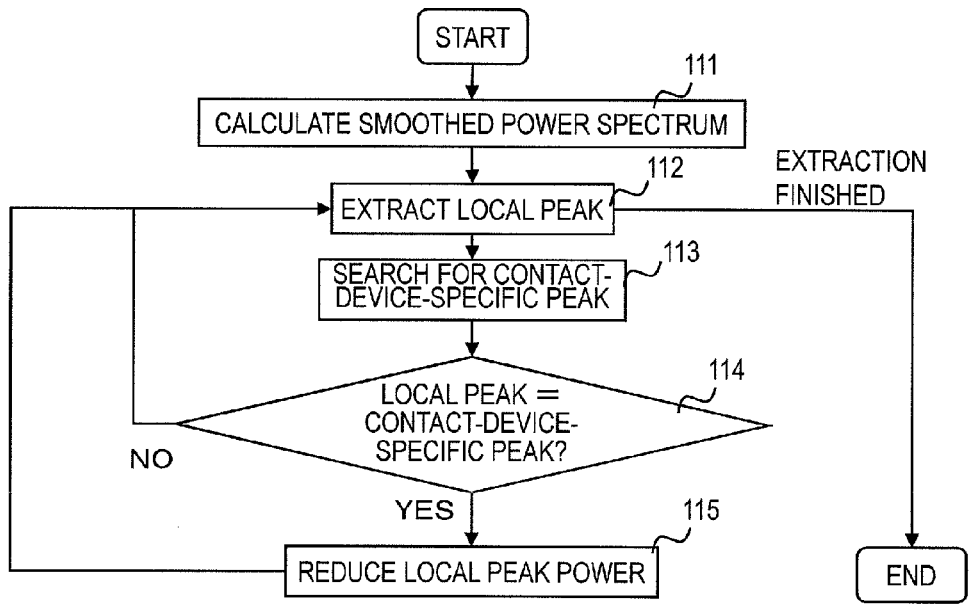
FIG. 12 is a flowchart showing the procedure of power peak removal processing to get done by a contact-device-specific oscillation removing section 210.

FIG. 12 is a flowchart showing the procedure of the power peak removal processing to get done by the contact-device-specific oscillation removing section 210. On the other hand, FIG. 13 shows a power spectrum with the power peak 123 removed.

Figure 13:
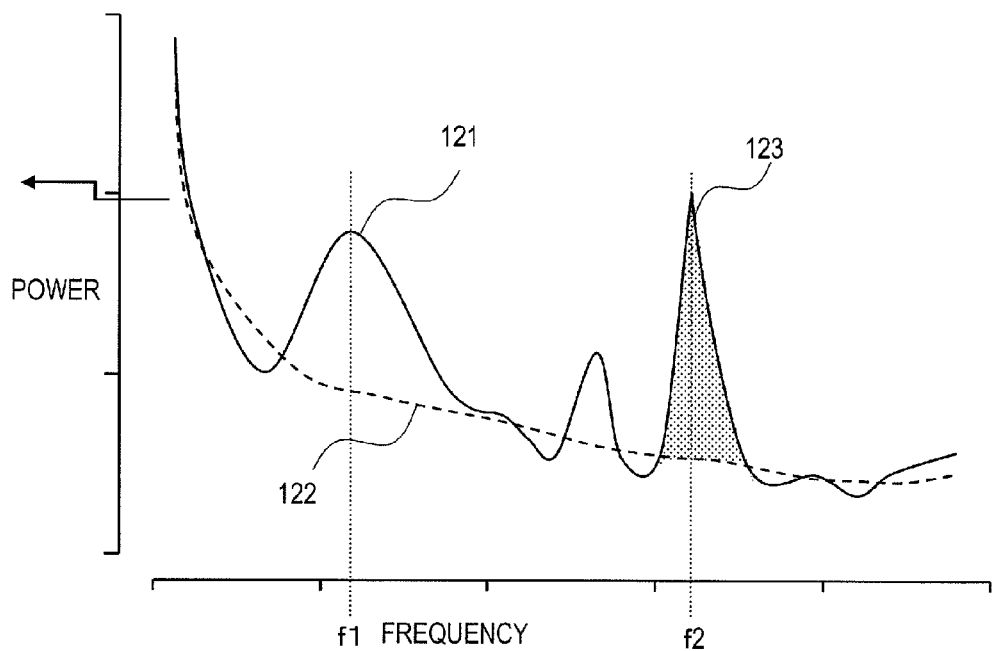
FIG. 13 shows a power spectrum with the power peak 123 removed.

First, in the smoothed power spectrum calculating step 111 shown in FIG. 12, the contact-device-specific oscillation removing section 210 calculates a smoothed power spectrum 122 based on the power spectrum 121 as shown in FIG. 13. Specifically, the contact-device-specific oscillation removing section 210 obtains a gentle smoothed power spectrum 122 by calculation by removing local peaks from the output Vp(f) of the frequency analyzing section 211.

Next, in the local peak extracting step 112, the contact-device-specific oscillation removing section 210 extracts respective local peaks from the output Vp(f) of the frequency analyzing section 211. The local peaks may be extracted not only when the power has a local maximum value but also according to the power level or the resonance Q value as well. Subsequently, in the contact-device-specific peak searching step 113, the table shown in FIG. 9 is referred to with the output (v, F) of the contact movement obtaining section 210, thereby searching the table for power peak information of the most similar contact movement, of which the frequency is closest to that of the local peak. When the power peak information associated with the local peak is searched for, not just the power peak information associated with the most similar contact movement but also power peaks associated with contact movements, of which the degrees of similarity are within a predetermined threshold value, may be searched for such a power peak, of which the frequency is closest to that of the local peak.

Next, in the decision step 114, the contact-device-specific oscillation removing section 210 determines whether or not the local peak is a contact-device-specific peak. This decision is made by determining whether or not the difference between the frequency of the local peak and that of the power peak located by searching falls within a predetermined range. If the answer is YES, the local peak is determined to be a contact-device-specific peak and the process advances to Step 115. Otherwise, the local peak is determined to be a non-contact-device-specific peak, no processing is performed, in particular, and the process goes back to Step 112.

Then, in the local peak power reducing step 115, the contact-device-specific oscillation removing section 210 lowers the overall power spectrum of a range, of which the power level is higher than that of the smoothed power spectrum, to the level of the smoothed power spectrum with respect to that frequency of the local peak.

Hereinafter, it will be described with reference to FIG. 13 what processing needs to be done if the local peak is a contact-device-specific peak and if not.

In FIG. 13, the frequencies f1 and f2 are supposed to be local peak frequencies that have been extracted in the local peak extracting step 113. If it has turned out, in the decision step 114, that no power peak information associated with the frequency f1 has been found even though the table stored in the contact-device-specific peak storage section 207 has been searched, then no processing is performed, in particular.

On the other hand, if any piece of power peak information associated with the frequency f2 has been found, then the power peak 123 to remove, of which the power level is higher than the smoothed power spectrum, has its power lowered to the level of the smoothed power spectrum.

This series of processing steps is repeatedly performed for each and every frequency that has been extracted in the peak frequency extracting step 113. In the example described above, the power level is supposed to be lowered to the level of the smoothed power spectrum that has been calculated based on the power spectrum Vp(f). However, it is also effective to use the average power information included in the power peak information that is stored in the contact-device-specific peak storage section 207 and lower the power peak crest gently by a quantity corresponding to the average power.

Even if not just frequencies and an average power but also parameters representing the probability distribution of frequencies are stored in the contact-device-specific peak storage section 207, the power peak to remove can also be determined by performing similar processing steps. Specifically, with respect to the local peak frequency f that has been obtained in the local peak extracting step 112, power peak information, of which the probability P (f|i) is the highest under the same contact movement condition i, is determined in the contact-device-specific peak searching step 113. Next, in the decision step 114, that probability P (f|i) is compared to a predetermined threshold value to see if the former value is equal to or greater than the latter, thereby determining whether or not the local peak is a contact-device-specific peak. If the answer is YES, the local peak power reducing step 115 is carried out.

The processing to get done by the contact-device-specific oscillation removing section 212 as described above corresponds to calculating 1/Hp(f) with the transfer functions Hp(f) and Hf(f) of Equation (7) adopted.

Next, the finger-pulp-specific oscillation superposing section 213 shown in FIG. 2 superposes a finger pulp power peak, associated with the transfer characteristic Hf(f) of the finger pulp represented by Equation (6), on the output of the contact-device-specific oscillation removing section 212. The power peak information to superpose is extracted by searching the finger-pulp-specific peak storage section 208 with the output (v, F) of the contact movement obtaining section 210. The power peak information to extract is associated with a contact movement that is most similar to the contact movement (v, F). Multiple pieces of power peak information may sometimes be stored in the finger-pulp-specific peak storage section 208 with respect to the same contact movement as shown in FIG. 9. In that case, all of those pieces of information are extracted.

The finger-pulp-specific oscillation superposing section 213 uses the peak frequency and peak average power of each piece of power peak information extracted to set a power peak with a predetermined Q value so that the power at the peak frequency is as high as the average power level. Or if an average Q value is stored as the power peak information, the power peak may also be set using that value as well.

Figure 14:
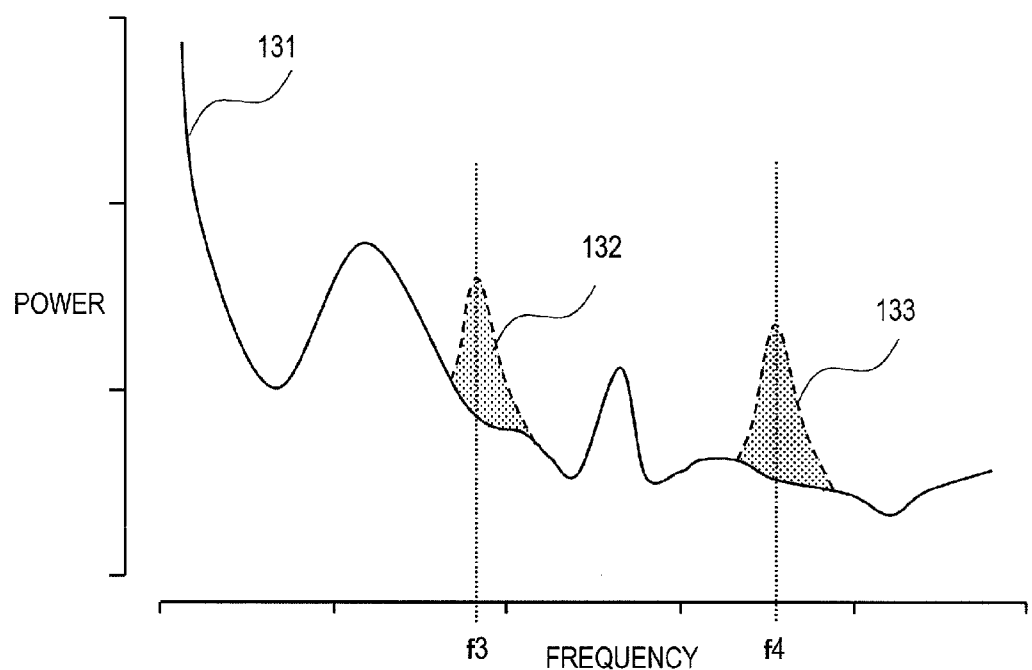
FIG. 14 shows a power spectrum 131 and two power peaks 132 and 133 superposed.

FIG. 14 shows a power spectrum 131 and two power peaks 132 and 133 superposed.

Suppose the power peak information that has been obtained by searching the finger-pulp-specific peak storage section 208 with respect to the contact movement (v, F) has peak frequencies f3 and f4. In that case, the finger-pulp-specific oscillation superposing section 213 sets the power peaks 132 and 133 based on the average power information that is included in the power peak information and superposes those peaks 132 and 133 on the power spectrum 131.

If the power peak information is stored in the finger-pulp-specific peak storage section 208 as a probability distribution, not as frequencies and powers, then the power peaks to superpose may be determined in the following manner. Specifically, in that case, with respect to the power peak information (which is parameters representing respective probability distributions and) associated with the contact movement condition i, the finger-pulp-specific oscillation superposing section 213 assigns frequencies, finds a frequency associated with the highest probability, and obtains sets of probability values. Based on these data collected, the finger-pulp-specific oscillation superposing section 213 extracts frequencies, of which the probability values exceed a predetermined value, and then performs superposition processing using those frequencies as power peak frequencies to superpose.

The processing to get done by the finger-pulp-specific oscillation superposing section 213 as described above corresponds to multiplying the transfer functions Hf(f) of the finger pulp in Equation (7).

According to the method described above, the contact-device-specific peaks and finger-pulp-specific peaks are supposed to be searched for using the contact movement as a condition. However, this is just an example. Alternatively, the best contact movement may be predicted and determined automatically from the set of power peak information that is stored in the contact-device-specific peak storage section 207. Hereinafter, such a method will be described with reference to FIG. 13.

First of all, as in the method described above, the finger-pulp-specific oscillation superposing section 213 extracts local peaks, which are recognized to be power peaks, from the frictional vibration that has been subjected to the frequency analysis. In FIG. 13, shown are frequencies f1 and f2 associated with such local peaks.

Meanwhile, the contact-device-specific peak storage section 207 can define a set of frequencies associated with power peaks on a contact movement basis. For example, the contact-device-specific peak storage section 207 may define a set of power peak frequencies associated with a contact movement i as $\{fi1, fi2, \ldots\}$. If the score indicating the degree of matching between the frequency set $\{f1, f2, \ldots\}$ that has been obtained based on the frictional vibration and the frequency set $\{fi1, fi2, \ldots\}$ on a contact movement basis is supposed to be the number of frequencies that are included in both of these two sets, for example, one contact-movement-based frequency set with the highest score can be selected. Consequently, a contact movement associated with the frequency set selected becomes the predicted contact movement.

Once the contact movement has been predicted, the rest of the processing may be performed in exactly the same procedure as described above. This method is also applicable to a situation where the power peak information is stored as a probability distribution. That is to say, if the probability score is calculated on the supposition that the frequency set $\{f1, f2\}$ of the frictional vibration is an observed value based on the contact-movement-based probability set, the best contact movement can also be predicted.

If such processing is adopted, no contact movement information needs to be used by the contact-device-specific peak storage section 207 and the finger-pulp-specific peak storage section 208 to search for the contact-device-specific peak and the finger-pulp-specific peak. Thus, the component called contact movement obtaining section 210 is no longer needed.

Thus, the output of the finger-pulp-specific oscillation superposing section 213 is an estimated power spectrum Vf(f) of the frictional vibration that would be produced if the object T were traced with a finger pulp. That is why by restoring the output of the finger-pulp-specific oscillation superposing section 213 into the original time wave signal, the frictional vibration produced on the finger pulp surface can be estimated. The frictional vibration synthesizing section 214 performs such processing.

To restore the signal expressed in the frequency space into the original time wave signal, not just the power spectrum but also phase information are needed as well. The contact-device-specific oscillation removing section 212 and the finger-pulp-specific oscillation superposing section 213 do transform only the power spectrum but do no transformation at all on the phase information. Nevertheless, when a person gets a tactile sensation, the difference in phase characteristic between the contact device and the finger pulp should not be so important a factor. That is why even if the phase information obtained by the frequency analyzing section 211 were used as it is, the tactile feedback itself should not be affected so much. For that reason, the frictional vibration synthesizing section 214 transforms the frequency space signal into the periodic time wave signal by applying a technique such as an inverse Fourier transform to both the power spectrum and the phase information.

The tactile simulator 215 displays the periodic time wave, which is the output of the frictional vibration synthesizing section 214, as a vibration, i.e., vibrates the surface of the finger pulp that is pressed against the tactile simulator 215. As a result, a virtually realistic tactile sensation is displayed to the finger pulp on the tactile simulator 215 as if the person were tracing the object T itself.

By performing these processing steps using not only the frictional vibration information that has been collected by tracing the object with the contact device but also the contact-device-specific power peaks and finger-pulp-specific power peaks, the tactile sensation that would be caused if the person traced the object with his or her finger pulp can be simulated naturally, irrespective of the type of the given object.

The respective components shown in FIG. 2 may be implemented as the following pieces of hardware. Specifically, the frictional vibration obtaining sections 203, 209 and the contact movement obtaining sections 204, 210 may be implemented as the sensor shown in FIG. 3 or 11. On the other hand, the frequency analyzing sections 205, 211, the power peak determining section 206, the contact-device-specific oscillation removing section 212, the finger-pulp-specific oscillation superposing section 213, and the frictional vibration synthesizing section 214 may be implemented as a computer, for example. The contact-device-specific peak storage section 207 and the finger-pulp-specific peak storage section 208 may be implemented as a storage device or medium such as a hard disk drive (HDD), a memory card or a solid-state drive (SSD). And the tactile simulator 215 may be implemented as an actuator with a vibration mechanism such as a voice coil motor.

The tactile feedback apparatus of this preferred embodiment is implemented mainly by a computer system. In that case, the operations described above get done by making a processor included in the computer system execute a computer program that is stored in a memory (such as a RAM).

For example, the processor of the tactile feedback system (or tactile feedback apparatus) of the first preferred embodiment executes a computer program that is defined based on the flowchart shown in FIG. 7, thereby getting done the power peak removal processing by the contact-device-specific oscillation removing section 212. In addition, the processor also executes a computer program that is defined based on the flowchart shown in FIG. 12, thereby getting done the power peak removal processing by the contact-device-specific oscillation removing section 212. That is to say, in each of these two different series of processing, the processor works as the contact-device-specific oscillation removing section 212. In any case, by making the processor execute the computer program, the overall operation of the tactile feedback system (or apparatus) gets done.

Such a computer program may be circulated on the market as a product by being stored on a storage medium such as a CD-ROM or downloaded over telecommunications lines such as the Internet. Alternatively, the operation of the tactile feedback apparatus described above may also be performed by a piece of hardware such as a DSP by installing a computer program in a semiconductor circuit.

The same can be said about each of other preferred embodiments of the present invention to be described below. That is to say, every other preferred embodiment of the present invention may be implemented as a computer system that executes a computer program using the same piece of hardware as that of the preferred embodiment described above.

Embodiment 2

A tactile feedback apparatus as a second specific preferred embodiment of the present invention uses not only all of the basic components already described for the first preferred embodiment of the present invention but also multiple combinations of contact devices for getting a feel of the material and contact-device-specific peak information about those contact devices. Thus, the tactile feedback can be made by changing the contact devices or the contact-device-specific peak information to use according to the situation of the material, of which the feel should be simulated.

Figure 15:
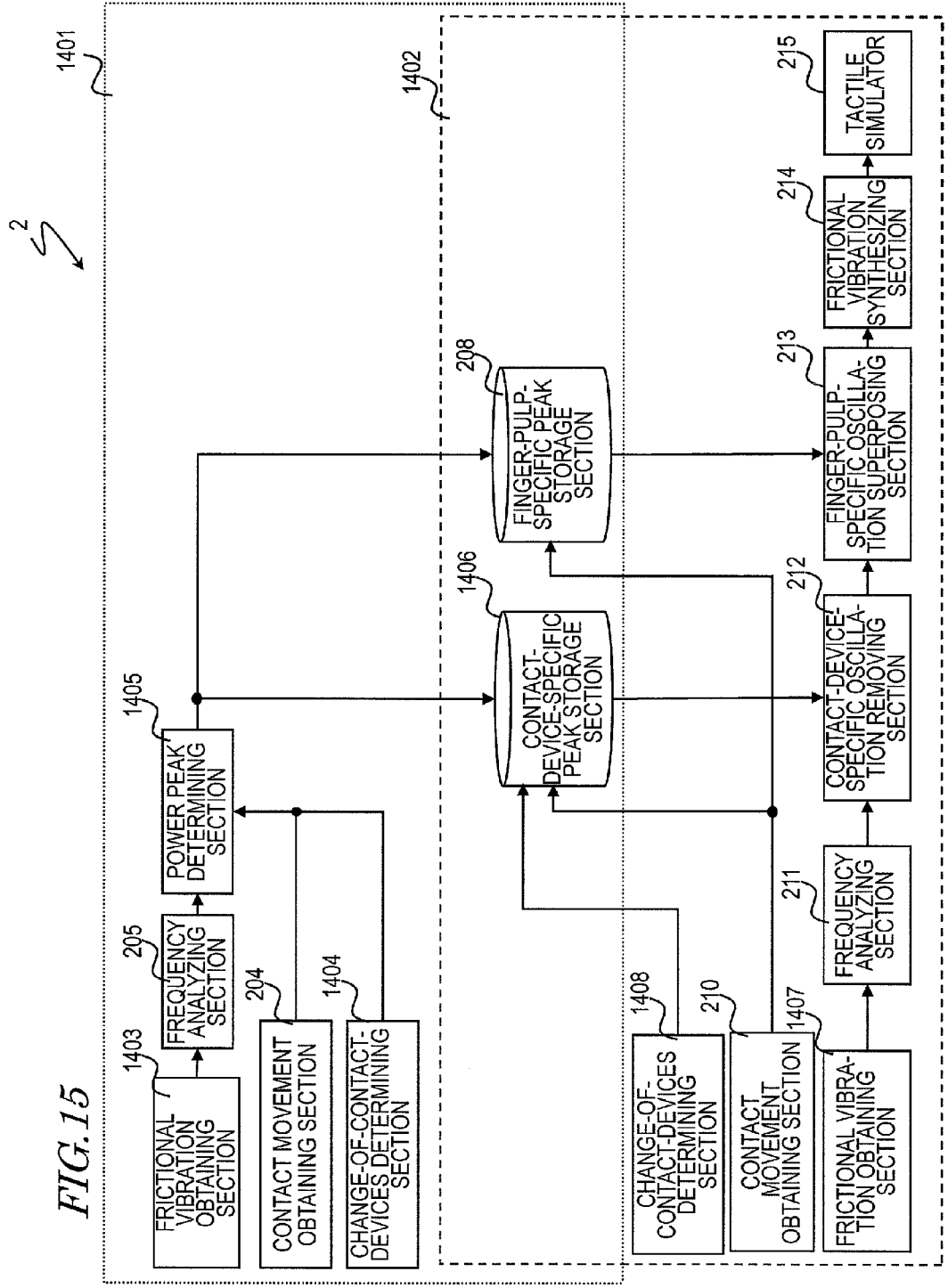
FIG. 15 is a block diagram illustrating a tactile feedback apparatus 2 as a second preferred embodiment of the present invention.

FIG. 15 is a block diagram illustrating a tactile feedback apparatus 2 as a second preferred embodiment of the present invention.

In FIG. 15, any component also included in the tactile feedback apparatus shown in FIG. 2 and having substantially the same function as its counterpart is identified by the same reference numeral and a detailed description thereof will be omitted herein. Just like the tactile feedback apparatus 1 of the first preferred embodiment shown in FIG. 2, the tactile feedback apparatus 2 shown in FIG. 15 also has two major components that are a power peak learning section 1401 and a tactile feedback performing section 1402.

The power peak learning section 1401 includes not only every component of the power peak learning section 201 shown in FIG. 2 but also a change-of-contact-devices determining section 1404 as well. By using the change-of-contact-devices determining section 1404, contact-device-specific peak information associated with multiple contact devices can be collected by learning and stored.

A change-of-contact-devices determining section 1408 is also added to the tactile feedback performing section 1402. The change-of-contact-devices determining section 1408 outputs a contact device identifying signal associated with the contact device to be used in the frictional vibration obtaining section 1407 and uses contact-device-specific peak information associated with that contact device, thereby contributing to the tactile feedback.

Hereinafter, the processing to get done by the power peak learning section 1401 will be described mainly about its difference from the power peak learning section 201 of the first preferred embodiment shown in FIG. 2.

In the first preferred embodiment described above, when the contact-device-specific peak learning is carried out, multiple sets of information about the frictional vibrations produced are collected by making n (where n≥1) different kinds of contact movements on m (where m≥1) different objects. According to this preferred embodiment, a frictional vibration obtaining section 1403 with p (where p≥2) different contact devices is used and multiple sets of information about the frictional vibrations produced are collected with respect to each of those contact devices. That is to say, the number of sets of information about the frictional vibrations produced becomes p×m×n.

When information about the frictional vibration produced is obtained, the change-of-contact-devices determining section 1404 outputs a signal indicating which of the p different contact devices has been used. The contact device used will be identified herein by g. A power peak determining section 1405 extracts a power peak for each contact device by performing processing in the same procedure as the power peak determining section 206 of the first preferred embodiment described above. The power peak information thus obtained in terms of frequency and average power is output and stored in a contact-device-specific peak storage section 1406 in association the contact movement information (such as a relative velocity v and a pressing force F) and an index g indicating the identify of the contact device just like the output of the power peak determining section 206.

FIG. 16 shows an example of the table stored in the contact-device-specific peak storage section 1406. Comparing this table to the one shown in FIG. 9, it can be seen easily that a column of contact device indices, indicating by which contact device each set of power peak information has been obtained, is added to this table. However, the rest of the processing to get done by this power peak learning section 1401, including extraction of finger-pulp-specific peaks, is the same as what is carried out by the power peak learning section 201 of the first preferred embodiment, and the description thereof will be omitted herein.

Next, it will be described how the tactile feedback performing section 1402 makes a tactile feedback.

The frictional vibration obtaining section 1407 of the tactile feedback performing section 1402 has a number of contact devices and changes the contact devices to use appropriately, thereby obtaining information about the frictional vibration produced on the object, of which the material feel should be simulated. The contact devices to use may be changed either by making the user manually turn a selector switch (not shown) provided outside of the frictional vibration obtaining section 1403 or in accordance with the output of a sensor that automatically determines that it is time to change contact devices. In any case, the change-of-contact-devices determining section 1408 outputs a signal identifying the contact device selected.

The power peak to be removed by the contact-device-specific oscillation removing section 212 is determined by searching the contact-device-specific peak storage section 1406 in accordance with signals supplied from the contact movement obtaining section 210 and the change-of-contact-devices determining section 1408 so that an appropriate power peak is set for the contact device that has been used by the frictional vibration obtaining section 1407. However, the rest of the processing to get done by this tactile feedback performing section 1402, including the processing step performed by the finger-pulp-specific oscillation superposing section, is the same as what has already been described for the first preferred embodiment, and the description thereof will be omitted herein.

In this preferred embodiment, each of the frictional vibration obtaining sections 1403 and 1407 is supposed to have a number of contact devices materially. However, this is only an example of the present invention. Alternatively, the same technique is applicable in quite the same way to even a situation where the effect achieved by varying the oscillation characteristic of the only contact device is as if there were multiple contact devices. In this case, the oscillation characteristic of the contact device either may be varied intentionally by changing the force, voltage or electromagnetic field applied to the contact device or may vary by itself due to some wear or deterioration with time.

By adopting such a configuration, the tactile feedback apparatus 2 of this preferred embodiment not only performs the tactile feedback function of its counterpart 1 of the first preferred embodiment but also would achieve the following effect. Specifically, the tactile feedback apparatus 2 can get information about the frictional vibration produced by using the best one of the contact devices according to the broad category of the object of tactile feedback such as metal, clothes or viscous substance. That is why the quality of the frictional vibration to be produced to simulate the tactile sensation improves and the degree of reality of the material feel simulated increases. In addition, considering that a contact device might get hurt if the object of tactile feedback has a high temperature, the best contact device can be used selectively according to the status of the object so that even when rubbed against the object, the contact device will stay in shape. As a result, the applicability of the sensor section, including the contact device, can be broadened. On top of that, any variation in oscillation characteristic due to the wear of the contact device or deterioration with time can be coped with appropriately. Consequently, a tactile feedback apparatus that can withstand a long-term use can be provided.

Embodiment 3

A tactile feedback apparatus as a third specific preferred embodiment of the present invention not only uses all of the basic components already described for the first preferred embodiment of the present invention but also collects and stores multiple sets of finger-pulp-specific peak information for finger pulps with mutually different physical properties. And when a particular material feel should be displayed to a given finger pulp on the tactile simulator, the best one of the multiple sets of finger-pulp-specific peak information is used selectively for tactile feedback according to the property of the given finger pulp. As a result, it is possible to prevent the person from finding the tactile sensation caused on his or her finger pulp unnatural due to a disagreement in finger pulp property.

Figure 17:
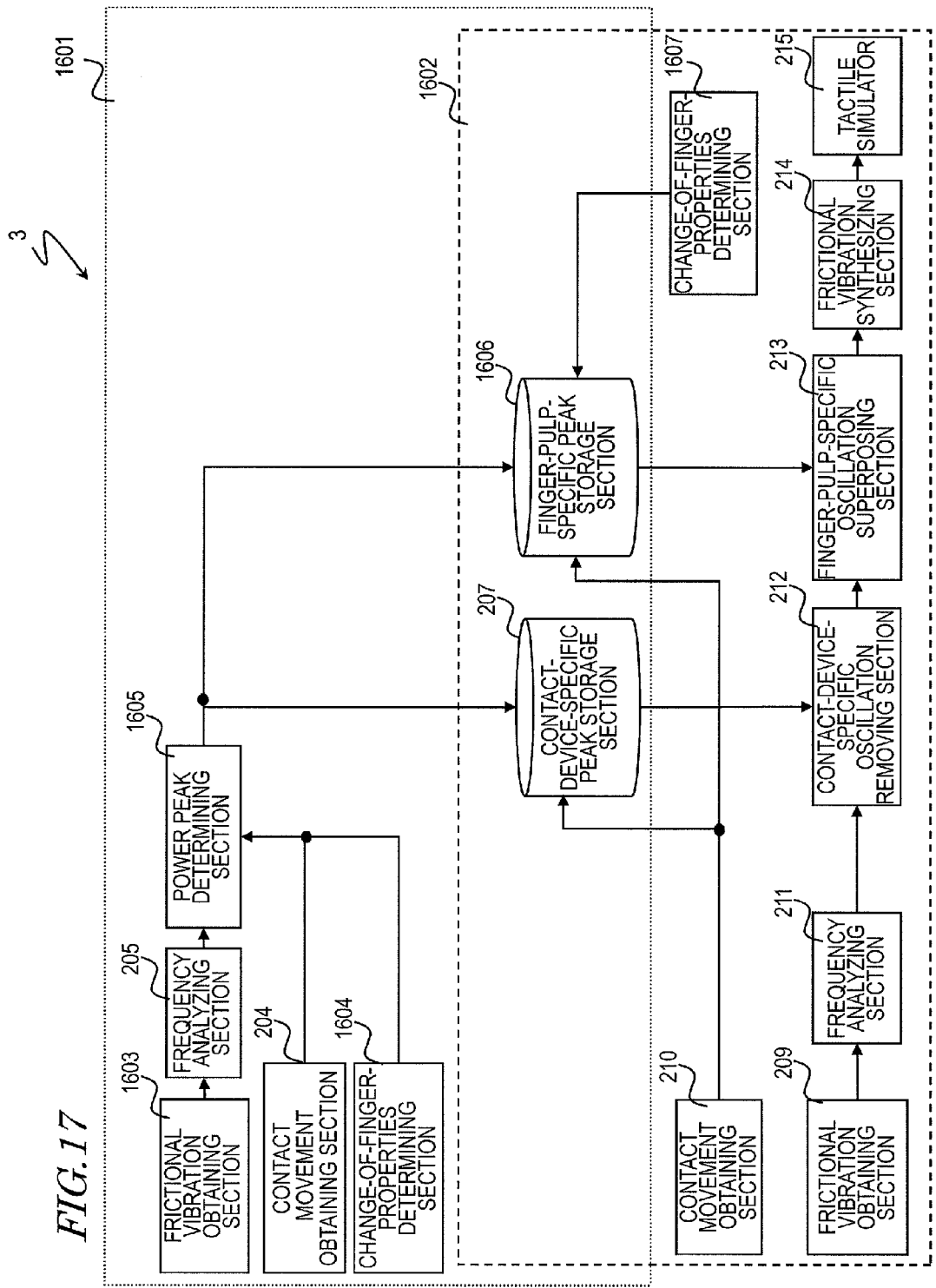
FIG. 17 is a block diagram illustrating a tactile feedback apparatus 3 as a third specific preferred embodiment of the present invention.

FIG. 17 is a block diagram illustrating a tactile feedback apparatus 3 as a third specific preferred embodiment of the present invention.

In FIG. 17, any component also included in the tactile feedback apparatus 1 shown in FIG. 2 and having substantially the same function as its counterpart is identified by the same reference numeral and a detailed description thereof will be omitted herein. As the contact-device-specific peak storage section stores power peak information for each of multiple contact devices in the second preferred embodiment of the present invention described above, the finger-pulp-specific peak storage section stores power peak information for each of multiple finger pulp properties in the tactile feedback apparatus 3 of this third preferred embodiment. Hereinafter, the third preferred embodiment of the present invention will be described with reference to not only FIG. 17 but also FIG. 15 illustrating the second preferred embodiment when necessary.

Just like the tactile feedback apparatuses of the first and second preferred embodiments described above, the tactile feedback apparatus 3 shown in FIG. 17 also has two major components that are a power peak learning section 1601 and a tactile feedback performing section 1602.

The power peak learning section 1601 includes not only every component of the power peak learning section 201 shown in FIG. 2 but also a change-of-finger-properties determining section 1604 as well. By using the change-of-finger-properties determining section 1604, finger-pulp-specific peak information associated with multiple different finger properties can be collected by learning and stored.

A change-of-finger-properties determining section 1607 is also added to the tactile feedback performing section 1602. The tactile feedback performing section 1602 searches the finger-pulp-specific peak storage section 1606 for a power peak associated with the finger property that is designated in the output of the change-of-finger-properties determining section 1607. Then, the finger-pulp-specific oscillation superposing section 213 superposes the power peak that has been found by the search, thereby making a tactile feedback. As a result, a tactile simulation signal can be synthesized according to the property of the finger pulp on the tactile simulator 215. Consequently, the frictional vibration that would be produced on the finger pulp if person actually touched the object can be simulated with more fidelity.

Hereinafter, the processing to get done by the power peak learning section 1601 will be described mainly about its difference from the power peak learning sections 201 and 1401 of the first and second preferred embodiments shown in FIGS. 2 and 15, respectively.

In the first preferred embodiment described above, when the finger-pulp-specific peak learning is carried out, m (where m≥1) different objects are traced with a finger pulp by making n (where n≥1) different kinds of contact movements on them, thereby collecting information about the frictional vibrations produced there. According to this preferred embodiment, by having q (where q≥2) subjects trace the objects with their finger pulp, information about the frictional vibrations produced as a result of the tracing movements is collected. That is to say, the number of sets of information about the frictional vibrations produced becomes q×m×n. And when information about the frictional vibration produced on the finger pulp is collected, the change-of-finger-properties determining section 1604 outputs a signal indicating who (identified herein by "h") traced the object among those q subjects.

A power peak determining section 1605 extracts a power peak on a finger pulp basis by performing processing in the same procedure as the power peak determining section 206 of the second preferred embodiment described above. The power peak information thus obtained in terms of frequency and average power is output and stored in a finger-pulp-specific peak storage section 1606 in association the contact movement information (such as a relative velocity v and a pressing force F) and an index h indicating the identify of the subject just like the output of the power peak determining section 206. An exemplary table stored may be just like that of the second preferred embodiment shown in FIG. 16 except that the contact device indices are replaced with subject indices h.

In this example, results obtained from q subjects that were selected at random are supposed to be stored in the finger-pulp-specific peak storage section 1606. However, this is only an example of the present invention. Alternatively, q' subjects (where q'>q) may be gathered, information about the frictional vibrations produced on their finger pulps may be collected, and then results may be clustered and stored as q sets. Still alternatively, several different kinds of physical properties, including the moduli of elasticity of the q' subjects' finger pulps, may be measured. Those q' subjects may be classified into q groups according to their properties so that the subjects in each group have similar properties. q representatives may be chosen from those q groups according to the physical property value of their finger pulp. And the frictional vibrations produced on those q subjects' finger pulps may be used. Nevertheless, if the finger-pulp-specific peaks are extracted from those q' subjects' finger pulps, then the column of subjects' indices on the table to be stored in the finger-pulp-specific peak storage section 1606 consists of finger property indices indicating that data has been sorted out according to those subjects' finger properties, not the subjects themselves. However, the rest of the processing to get done by this power peak learning section 1601, including extraction of contact-device-specific peaks, is the same as what has already been described for the first preferred embodiment, and the description thereof will be omitted herein.

Next, it will be described how the tactile feedback performing section 1602 makes a tactile feedback. Until the contact-device-specific oscillation removing section 212 performs its processing step, the tactile feedback performing section 1602 performs its processing in exactly the same way as its counterpart 202 of the first preferred embodiment described above. A major difference from the first preferred embodiment lies in the procedure in which the finger-pulp-specific peak to be superposed by the finger-pulp-specific oscillation superposing section 213 is searched for. Specifically, according to this preferred embodiment, the finger-pulp-specific peak storage section 1606 stores different finger-pulp-specific peaks for either different subjects who will put their finger on the tactile simulator 215 or different finger properties. And the change-of-finger-properties determining section 1607 may output a signal in order to change the finger properties to use.

The change-of-finger-properties determining section 1607 has an input I/F to identify the subject (i.e., the person who touches the object) and may output a subject index in response to the data entered. Alternatively, the change-of-finger-properties determining section 1607 may include a switch with labels such as "woman", "man" and "kid" for broadly classifying the finger properties and may choose one of those labels and output its associated finger property index. Still alternatively, the change-of-finger-properties determining section 1607 may have a sensor for measuring the elastic properties of the finger pulps and may selectively output the most appropriate finger property index by making the subject at the tactile simulator 215 put his or her finger on that sensor. When the finger-pulp-specific peak is searched for, the most appropriate set of finger-pulp-specific peaks is selected according to the respective outputs of the change-of-finger-properties determining section 1607 and the contact movement obtaining section 210. After that, the tactile feedback is carried out based on the power peak information thus selected in quite the same way as in the tactile feedback performing section 202 of the first preferred embodiment, and the description thereof will be omitted herein.

In the preferred embodiment described above, a number of finger-pulp-specific peaks are stored in association with multiple different finger pulp properties and a most appropriate one of them is searched for by narrowing those peaks with either a subject index or a finger pulp property index. However, this is only an example of the present invention. Alternatively, a synthetic finger-pulp-specific peak may be generated and used by combining together a number of finger-pulp-specific peaks associated with respectively different finger pulp properties. With such a method adopted, even if no data stored in the finger-pulp-specific peak storage section 1606 does not exactly match the finger pulp property that has been measured by the change-of-finger-properties determining section 1607, an appropriate finger-pulp-specific peak can still be generated for the finger pulp under measurement. Consequently, tactile feedback can be made adaptively to the subject at the tactile simulator 215.

By adopting such a configuration, not just the tactile feedback function performed by the tactile feedback apparatus of the first preferred embodiment described above but also the following effect can be achieved as well. Generally speaking, although we use the word "finger pulp" casually, the property of the finger pulp is not always the same but actually there are many different sorts of finger pulps. That is to say, fingers may sometimes be soft and small but sometimes be horny and big according to sex, age, or things that the fingers contact with daily. Thus, there are finger pulps with various vibration properties. Nevertheless, a finger pulp surface vibration that has been simulated using a finger-pulp-specific peak obtained from a finger with standard hardness could be displayed to the finger pulp of a horny finger. In that case, the latter person should not get a realistic tactile sensation on his or her finger pulp. To overcome such a problem, a number of finger-pulp-specific peaks may be obtained in advance for finger pulps with multiple different vibration properties and an appropriate one of those peaks may be used adaptively to the subject at the tactile simulator 215. Then, such variance that would otherwise be caused due to a difference in finger pulp vibration property between individual subjects can be reduced significantly. As a result, everybody will get a highly realistic tactile sensation on his or her finger pulp. Furthermore, if the person who puts his or her finger on the tactile simulator 215 is known in advance, then the finger-pulp-specific peak associated with that person's finger pulp needs to be obtained. In that case, the tactile feedback can be made even more appropriately for that person.

Although the second preferred embodiment of the present invention that uses multiple contact devices and the third preferred embodiment of the present invention that deals with a multiple finger pulp properties have been described separately, it is effective to combine these two preferred embodiments of the present invention together. In that case, a tactile feedback apparatus that achieves the effects of both of these two preferred embodiments of the present invention can be provided.

Embodiment 4

A tactile feedback system as a fourth specific preferred embodiment of the present invention not only uses the basic components of the first preferred embodiment described above but also has the capability to transmit the information that has been obtained based on the frictional vibration produced between a material and a contact device to a distant location over a network. Thus, according to this preferred embodiment, tactile sensation based communications can be carried out even if the person at one end cannot directly touch the object at the other end as in doing an online shopping over the Net.

Figure 18:
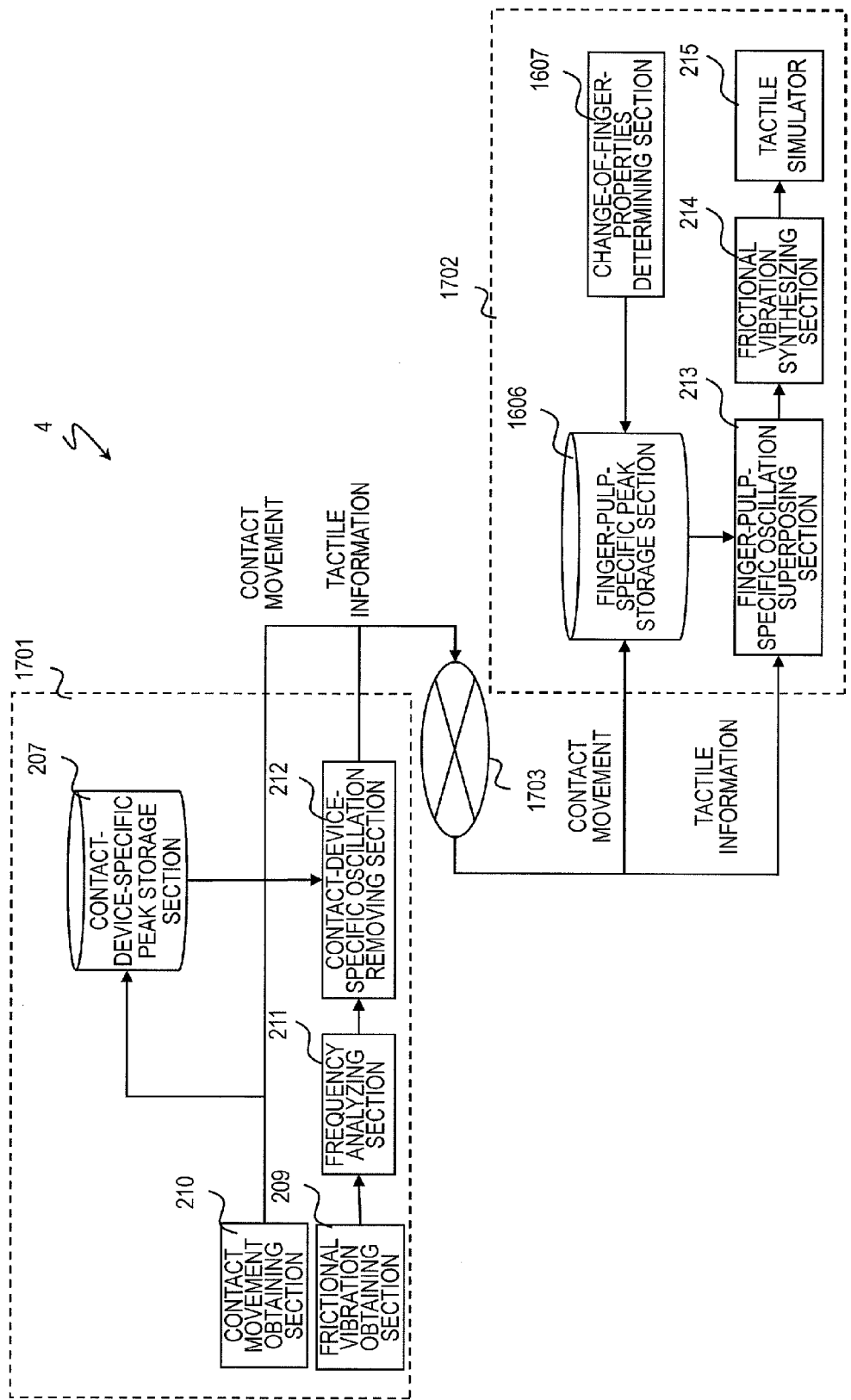
FIG. 18 is a block diagram illustrating a tactile feedback system 4 as a fourth preferred embodiment of the present invention.

FIG. 18 is a block diagram illustrating a tactile feedback system 4 as a fourth preferred embodiment of the present invention.

Just like the tactile feedback apparatuses of the first, second and third preferred embodiments of the present invention described above, this tactile feedback system also includes a power peak learning section (which may be the same as the power peak learning section 1601 shown in FIG. 17) and a tactile feedback performing section (which may be the same as the tactile feedback performing section 1602 shown in FIG. 17) as its major components. However, since the power peak learning section of the fourth preferred embodiment is the same as the one that has already been described for the third preferred embodiment, its illustration is omitted in FIG. 18.

In FIG. 18, any component also included in the tactile feedback apparatus 1 or 3 shown in FIG. 2 or 17 and having substantially the same function as its counterpart is identified by the same reference numeral and a detailed description thereof will be omitted herein.

The tactile feedback system 4 of this fourth preferred embodiment is quite different from its counterparts of the preferred embodiments described above in that the tactile feedback performing function of the tactile feedback apparatus 3 of the third preferred embodiment described above is performed over a telecommunications line 1703. In the following description, the procedure of tactile feedback will be described on the supposition that the contact-device-specific peaks and the finger-pulp-specific peaks that have been obtained by making multiple different kinds of contact movements on multiple objects in the power peak learning section according to the method of the third preferred embodiment described above are already stored in the contact-device-specific peak storage section 207 and the finger-pulp-specific peak storage section 1606, respectively.

This tactile feedback system 4 has two major components that are a tactile transmitting section 1701 and a tactile receiving section 1702. The tactile transmitting section 1701 transmits tactile information, which has been obtained based on the frictional vibration produced through contact with the object, over the telecommunications line 1703. On the other hand, the tactile receiving section 1702 receives the tactile information through the telecommunications line 1703, thereby making a tactile feedback.

The tactile transmitting section 1701 includes a frictional vibration obtaining section 209, a contact movement obtaining section 210, a frequency analyzing section 211, a contact-device-specific oscillation removing section 212, and a contact-device-specific peak storage section 207. Any component also included in the tactile feedback apparatus 1 shown in FIG. 2 and having substantially the same function as its counterpart is identified by the same reference numeral.

The frictional vibration obtaining section 209 traces the object T with a contact device to get information about the frictional vibration produced between them. The frictional vibration information is analyzed, and converted into a frequency space expression such as a power spectrum, by the frequency analyzing section 211. Then the contact-device-specific oscillation removing section 212 removes a contact-device-specific power peak from that frequency space expression. In this case, the power peak to remove is determined by searching the contact-device-specific peak storage section 207 using the contact movement as a search key. The output of the contact-device-specific oscillation removing section 212 is obtained by removing the power peak that can be attributed to the contact device from the frictional vibration produced between the contact device and the object, and therefore, can be regarded as generalized frictional vibration that does not depend on any specific contact device. And this piece of information representing tactile information and the contact movement information obtained by the contact movement obtaining section 210 are transmitted over the telecommunications line 1703.

The tactile receiving section 1702 includes a finger-pulp-specific peak storage section 1606, a finger-pulp-specific oscillation superposing section 213, a frictional vibration synthesizing section 214, a change-of-finger-properties determining section 1607, and a tactile simulator 215.

First of all, the tactile receiving section 1702 receives the tactile information and the contact movement information through the telecommunications line 1703. On the tactile information received, the finger-pulp-specific oscillation superposing section 213 superposes a finger-pulp-specific peak. More specifically, the finger-pulp-specific oscillation superposing section 213 determines the power peak to superpose by searching the finger-pulp-specific peak storage section 1606 using the tactile information received and the output of the change-of-finger-properties determining section 1607, representing the finger pulp property of the person touching the tactile simulator 215, as search keys. Next, the frictional vibration synthesizing section 214 transforms the tactile information, on which the finger-pulp-specific power peak has been superposed, into a periodic time wave. Then, the tactile simulator 215 displays that periodic time wave as a vibration to the person's finger pulp, thereby making a tactile feedback.

By adopting such a configuration, even a person who is located too distant from the object to touch it directly can also get a natural and realistic tactile sensation. On top of that, from the tactile information transmitted and received at this time, the factor depending on the contact device that has been used by the tactile transmitting section 1701 has already been removed. That is why there is no need for the tactile receiving section 1702 to consider what type of contact device has been used. Consequently, the tactile transmitting section 1701 and the tactile receiving section 1702 can perform their own processing totally independently of each other. Also, this telecommunications line 1703 can be used for making not only one-to-one communications but also one-to-many or even many-to-many communications as well. Specifically, the telecommunications line 1703 may be either a wide area network (WAN) such as the Internet or a local area network (LAN). Also, it does not matter whether the telecommunications line 1703 is wired or wireless.

By making communications in this manner over the telecommunications line 1703, in the field of remote surgery, for example, a doctor at a distant location can get a tactile sensation of the diseased part of a patient over the network. Or in the field of online shopping, the feel of a product can be displayed to a remote customer. What is more, if the feel of a single material can be multicast to a number of recipients at the same time, a new haptic communication tool can be provided.

In this example, only the tactile information and the contact movement information are supposed to be transmitted and received over the telecommunications line 1703. However, if a power peak needs to be estimated by using the modulus of elasticity and coefficient of friction of the object as well as described for the first preferred embodiment, those parameters may also be transmitted and received as well.

Considering that multiple devices are connected together via the telecommunications line 1703, this preferred embodiment is called a "tactile feedback system", not a "tactile feedback apparatus". However, even any of the first, second and third preferred embodiments of the present invention described above, each of which is supposed to be implemented with a single housing, can also be called a "tactile feedback system". This is because even such a tactile feedback apparatus implemented with a single housing has internal wiring, which also has a signal transmitting function and which can be regarded as being equivalent to the telecommunications line 1703 of this fourth preferred embodiment, broadly speaking. Thus, in this description, the "system" is a generic term that is applicable to not only a situation where the function of the present invention is performed by multiple devices but also a situation where the same function is performed by an apparatus with a single housing.

In summary, the tactile feedback apparatus of the present invention is advantageous over the prior art in that a signal cab be obtained with a finger-pulp-specific oscillation superposed on a signal, from which the contact-device-specific oscillation has been removed. That is why if a tactile feedback can be made even without restoring it into its original time wave signal, no frictional vibration synthesizing section is needed.

Furthermore, in each of the first through fourth preferred embodiments of the present invention described above, the tactile receiving section is supposed to have a tactile simulator. However, the tactile receiving section does not always have to have a tactile simulator.

For example, another terminal device with a tactile simulator may receive a synthetic signal, which has been transmitted from the frictional vibration synthesizing section over a network, for instance, and may display a simulated tactile sensation on that terminal. Alternatively, the present invention is also applicable to analyzing the synthetic signal itself that has been supplied from the frictional vibration synthesizing section without making any tactile feedback. Still alternatively, a storage section provided for the tactile receiving section may store character information corresponding to the synthetic signal supplied from the frictional vibration synthesizing section and output that character information. In that case, the character information may be a word that describes what kind of tactile sensation the person should get. Or the tactile sensation to be gotten may also be described by speech. Even so, if there is no need to restore the signal into the original time wave signal, no frictional vibration synthesizing section is needed, either.

According to the tactile feedback method of the present invention, by removing a contact-device-specific oscillation and superposing a finger-pulp-specific oscillation instead, a tactile sensation that a person should get by touching an object with his or her finger can be simulated virtually even in an environment where he or she actually cannot touch it directly. Thus, the present invention is applicable to online shopping in order to transmit the feel of a product to a customer at the receiving end and to a remote surgery in order to transmit the feel of a diseased part of a patient to a doctor at a distant location.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A tactile feedback system comprising:
a removing section for removing a contact-device-specific oscillating waveform, which is included in both of first and second contact-generated waveforms, from the first contact-generated waveform, wherein the first contact-generated waveform represents a frictional vibration produced when a contact device contacts with one object, and the second contact-generated waveform represents a frictional vibration produced when the contact device contacts with another object;
a superposing section for superposing a finger-pulp-specific oscillating waveform, which is included in both of first and second finger-pulp-generated waveforms, on the first contact-generated waveform, from which the contact-device-specific oscillating waveform has been removed, wherein the first finger-pulp-generated waveform represents a frictional vibration produced when a person's finger pulp contacts with the one object, and the second finger-pulp-generated waveform represents a frictional vibration produced when the finger pulp contacts with that another object; and
a simulating section for displaying a vibration stimulation based on the first contact-generated waveform on which the finger-pulp-specific oscillating waveform has been superposed.

2. The tactile feedback system of claim 1, wherein the contact-device-specific oscillating waveform is determined by object's physical quantity measured and by a type of contact movement between the contact device and the object, and
wherein the finger-pulp-specific oscillating waveform is also determined by the physical quantity measured and the contact movement.

3. The tactile feedback system of claim 1, wherein the contact movement is defined by a relative velocity of the contact device with respect to the object.

4. The tactile feedback system of claim 1, wherein the contact movement is defined by a load of the contact device that is pressed against the object.

5. The tactile feedback system of claim 1, wherein the contact-device-specific oscillating waveform is determined by a power peak that is included in the waveform representing the frictional vibration produced between the contact device and the object.

6. The tactile feedback system of claim 1, wherein the finger-pulp-specific oscillating waveform is determined by a power peak that is included in the waveform representing the frictional vibration produced between the finger pulp and the object.

7. The tactile feedback system of claim 1, wherein the contact-device-specific oscillating waveform is determined by the number of frictional vibration waveforms that have power peaks falling within a predetermined range in multiple waveforms representing frictional vibrations produced by tracing a plurality of objects with the contact device.

8. The tactile feedback system of claim 1, wherein the finger-pulp-specific oscillating waveform is determined by the number of frictional vibration waveforms that have power peaks falling within a predetermined range in multiple waveforms representing frictional vibrations produced by tracing a plurality of objects with the finger pulp.

9. The tactile feedback system of claim 1, wherein the first and second contact-generated waveforms are represented by a power spectrum showing a frequency-power relation, and
wherein the contact-device-specific oscillating waveform is a waveform component that is included in both of the power spectra of the first and second contact-generated waveforms.

10. The tactile feedback system of claim 1, wherein the first and second finger-pulp-generated waveforms are represented by a power spectrum showing a frequency-power relation, and
wherein the finger-pulp-specific oscillating waveform is a waveform component that is included in both of the power spectra of the first and second finger-pulp-generated waveforms.

11. A tactile feedback method comprising the steps of:
removing a contact-device-specific oscillating waveform, which is included in both of first and second contact-generated waveforms, from the first contact-generated waveform, wherein the first contact-generated waveform represents a frictional vibration produced when a contact device contacts with one object, and the second contact-generated waveform represents a frictional vibration produced when the contact device contacts with another object;
superposing a finger-pulp-specific oscillating waveform, which is included in both of first and second finger-pulp-generated waveforms, on the first contact-generated waveform, from which the contact-device-specific oscillating waveform has been removed, wherein the first finger-pulp-generated waveform represents a frictional vibration produced when a person's finger pulp contacts with the one object, and the second finger-pulp-generated waveform represents a frictional vibration produced when the finger pulp contacts with that another object; and
displaying a vibration stimulation based on the first contact-generated waveform on which the finger-pulp-specific oscillating waveform has been superposed.

12. A computer program stored on a non-transitory, computer-readable storage medium, and to be executed by a computer,
wherein the computer program is defined to make the computer perform the steps of:
removing a contact-device-specific oscillating waveform, which is included in both of first and second contact-generated waveforms, from the first contact-generated waveform, wherein the first contact-generated waveform represents a frictional vibration produced when a contact device contacts with one object, and the second contact-generated waveform represents a frictional vibration produced when the contact device contacts with another object;
superposing a finger-pulp-specific oscillating waveform, which is included in both of first and second finger-pulp-generated waveforms, on the first contact-generated waveform, from which the contact-device-specific oscillating waveform has been removed, wherein the first finger-pulp-generated waveform represents a frictional vibration produced when a person's finger pulp contacts with the one object, and the second finger-pulp-generated waveform represents a frictional vibration produced when the finger pulp contacts with that another object; and
displaying a vibration stimulation based on the first contact-generated waveform on which the finger-pulp-specific oscillating waveform has been superposed.

13. A tactile feedback system comprising:
a removing section for removing a contact-device-specific oscillating waveform, which is included in both of first and second contact-generated waveforms, from the first contact-generated waveform, wherein the first contact-generated waveform represents a frictional vibration produced when a contact device contacts with one object, and the second contact-generated waveform represents a frictional vibration produced when the contact device contacts with another object; and
a superposing section for superposing a finger-pulp-specific oscillating waveform, which is included in both of first and second finger-pulp-generated waveforms, on the first contact-generated waveform, from which the contact-device-specific oscillating waveform has been removed, wherein the first finger-pulp-generated waveform represents a frictional vibration produced when a person's finger pulp contacts with the one object, and the second finger-pulp-generated waveform represents a frictional vibration produced when the finger pulp contacts with that another object.

* * * * *